(12) United States Patent
Ueda et al.

(10) Patent No.: US 12,486,117 B2
(45) Date of Patent: Dec. 2, 2025

(54) ARTICLE TRANSPORT FACILITY

(71) Applicant: Daifuku Co., Ltd., Osaka (JP)

(72) Inventors: Toshihito Ueda, Hinocho (JP); Shota Inden, Hinocho (JP); Yoshitaka Tanaka, Hinocho (JP); Akira Suzuki, Hinocho (JP); Ayaka Kawanami, Hinocho (JP); Daisuke Ogawa, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 98 days.

(21) Appl. No.: 18/605,014

(22) Filed: Mar. 14, 2024

(65) Prior Publication Data

US 2024/0308782 A1  Sep. 19, 2024

(30) Foreign Application Priority Data

Mar. 15, 2023 (JP) .................. 2023-041138

(51) Int. Cl.
| | |
|---|---|
| *B65G 43/10* | (2006.01) |
| *B65G 17/00* | (2006.01) |
| *G05B 19/418* | (2006.01) |
| *G05D 1/43* | (2024.01) |
| *H01L 21/677* | (2006.01) |
| *B65G 1/04* | (2006.01) |

(Continued)

(52) U.S. Cl.
CPC ........... *B65G 43/10* (2013.01); *B65G 17/005* (2013.01); *G05B 19/41895* (2013.01); *G05D 1/43* (2024.01); *H01L 21/67724* (2013.01); *H01L 21/67733* (2013.01); *B65G 1/0457* (2013.01); *B65G 43/00* (2013.01); *B65G 2201/0297* (2013.01); *G05D 2107/70* (2024.01); *H01L 21/6773* (2013.01)

(58) Field of Classification Search
CPC ...... B65G 43/10; B65G 17/005; B65G 35/00; B65G 43/00; B65G 1/0457; B65G 35/06; B65G 49/061; B65G 2201/0297; G05B 19/41895; H01L 21/67715; H01L 21/67724; H01L 21/6773; H01L 21/67733; G05D 1/43; G05D 2107/70
See application file for complete search history.

(56) References Cited

U.S. PATENT DOCUMENTS 10,196,214 B2 * 2/2019 Motoori .................. B61K 1/02
11,513,534 B2 * 11/2022 Harasaki ........... H01L 21/67733
(Continued)

FOREIGN PATENT DOCUMENTS

JP   2006313463 A   11/2006

*Primary Examiner* — Mark A Deuble
(74) *Attorney, Agent, or Firm* — The Webb Law Firm

(57) ABSTRACT

In the case where a transport vehicle has received both a first passage permission and a second passage permission and is to pass through a second passing point, when the travel distance of the transport vehicle from a first stopping point reaches a first set distance, the transport vehicle issues, to a zone control device, a first occupation revocation request for revoking permission to occupy a first passing point, and when the travel distance of the transport vehicle from the first stopping point reaches a second set distance, the transport vehicle issues, to the zone control device, a second occupation revocation request for revoking permission to occupy the second passing point.

6 Claims, 13 Drawing Sheets

(51) Int. Cl.
*B65G 43/00* (2006.01)
*G05D 107/70* (2024.01)

(56) References Cited

U.S. PATENT DOCUMENTS

| | | | |
|---|---|---|---|
| 2007/0016366 A1* | 1/2007 | Nagasawa | G05D 1/0223 |
| | | | 701/413 |
| 2009/0317217 A1* | 12/2009 | Nishimura | B66F 9/063 |
| | | | 414/222.03 |
| 2017/0008700 A1* | 1/2017 | Wada | B61B 3/02 |
| 2018/0122671 A1* | 5/2018 | Niiyama | B65G 43/10 |
| 2021/0331708 A1* | 10/2021 | Takahara | B60W 60/0027 |
| 2022/0348415 A1* | 11/2022 | Li | B65G 43/10 |
| 2023/0242166 A1* | 8/2023 | Matsumoto | B65G 1/137 |
| | | | 246/28 R |
| 2024/0025657 A1* | 1/2024 | Ueda | B65G 35/06 |

* cited by examiner

Fig.6
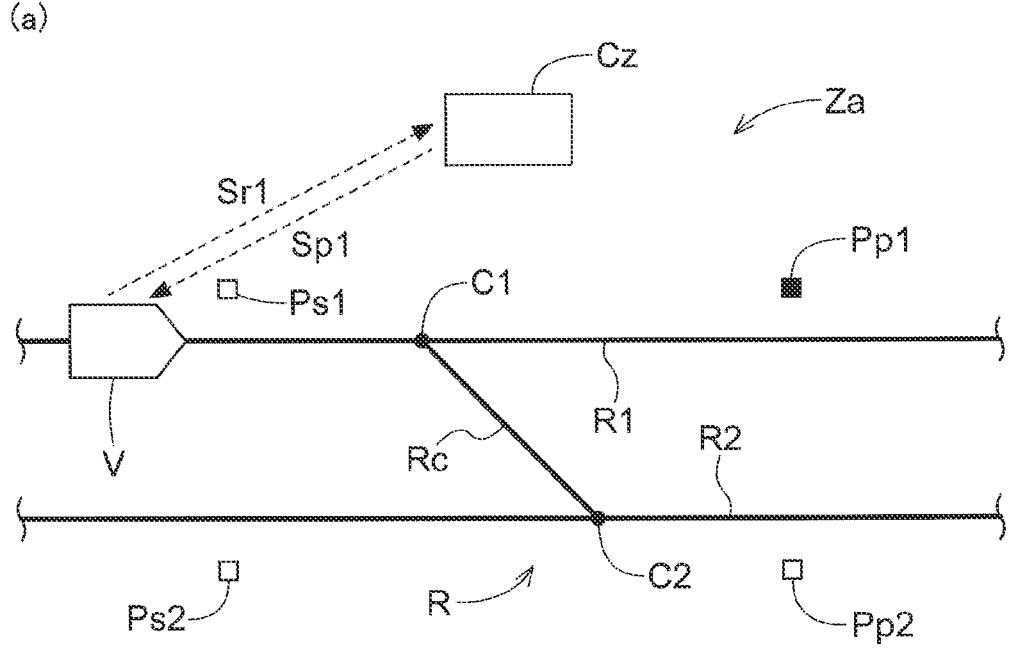
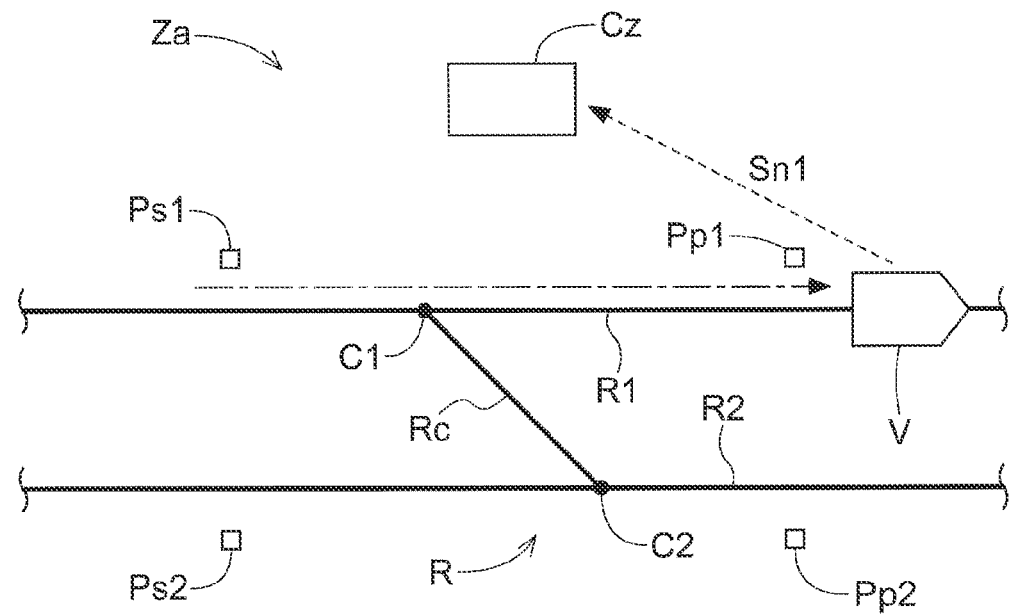

Fig.7
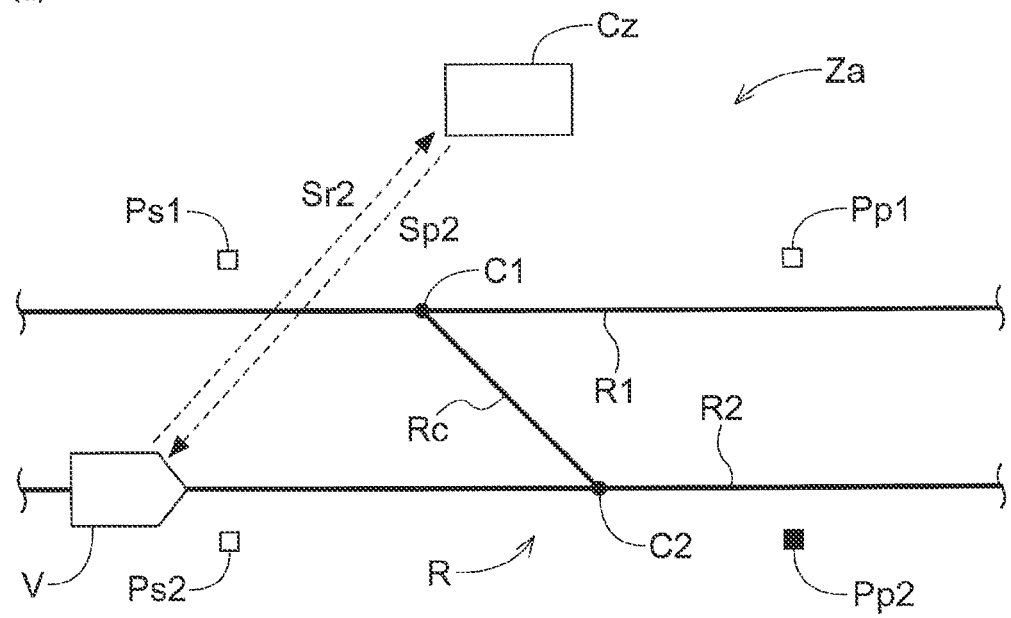
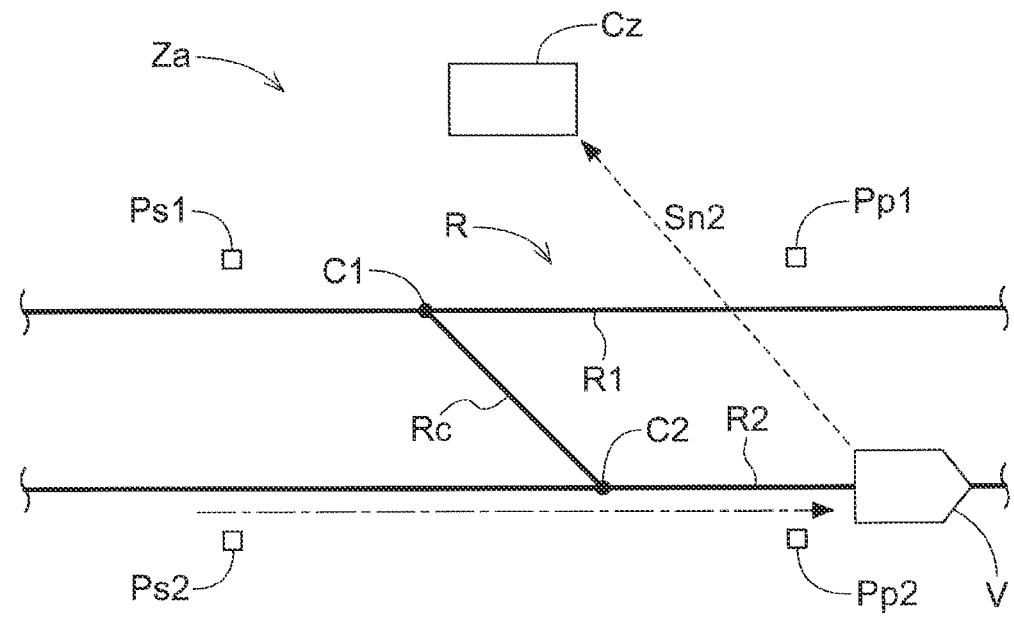

Fig.8
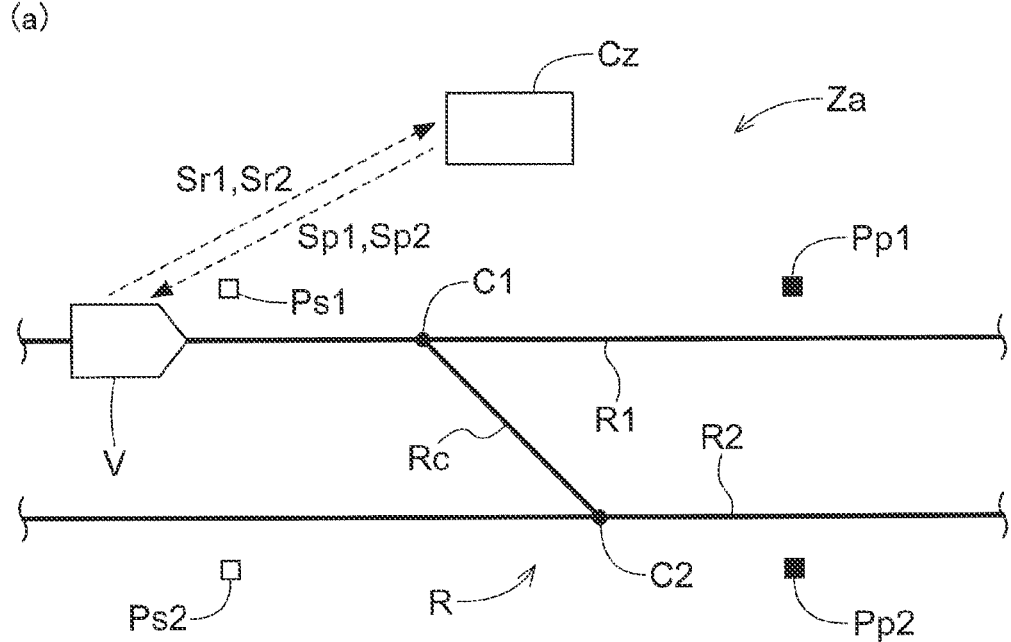
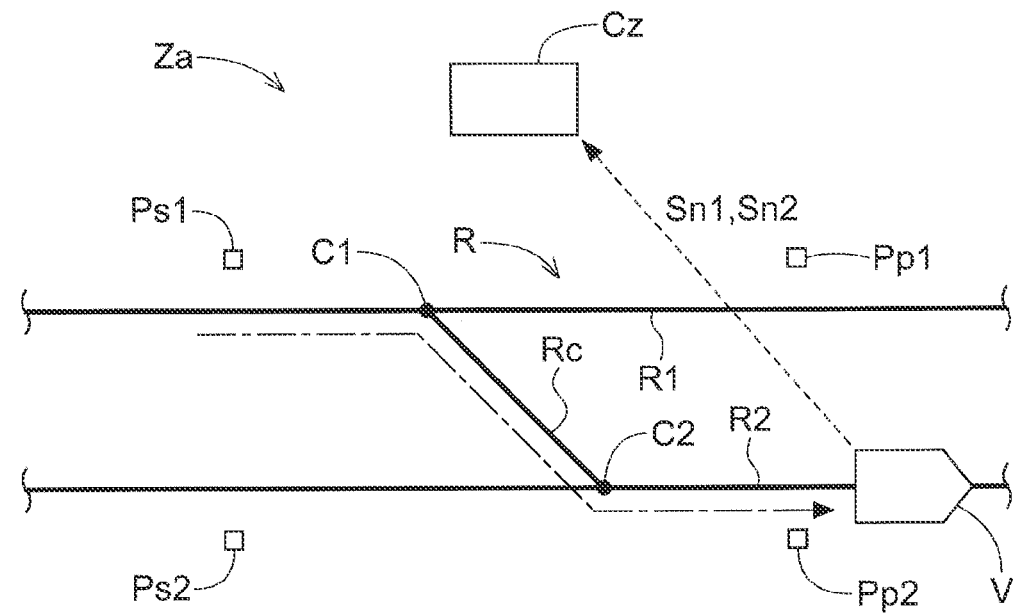

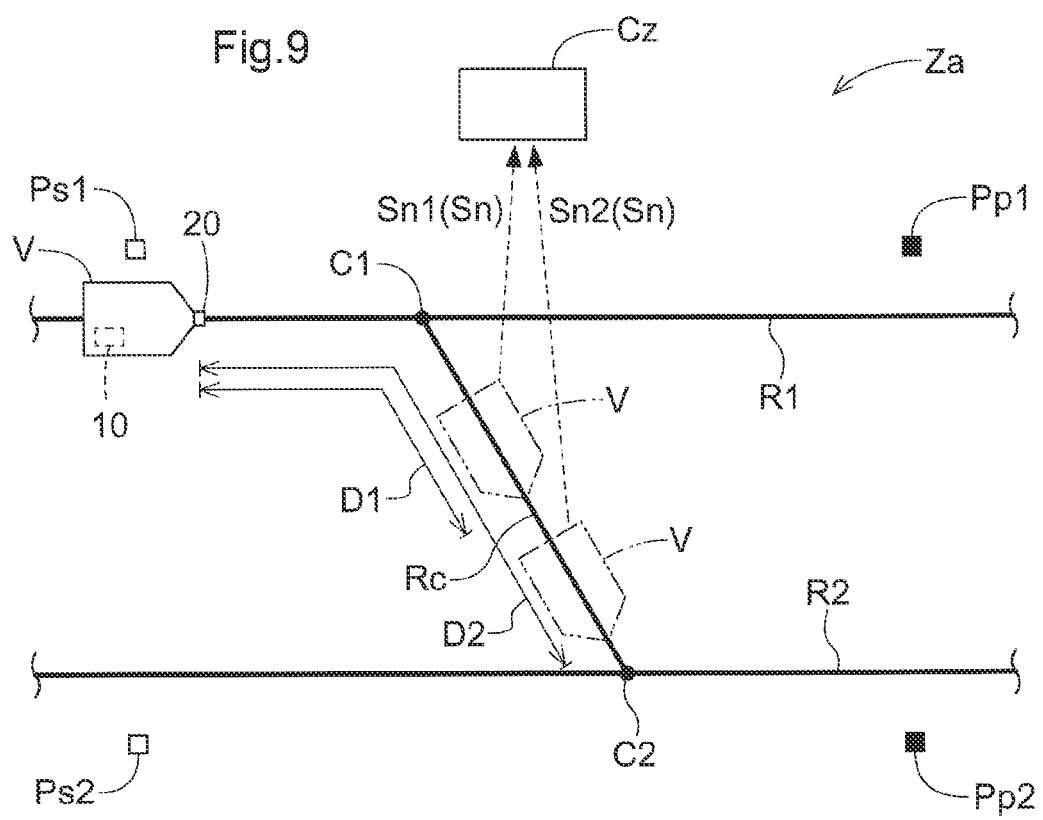
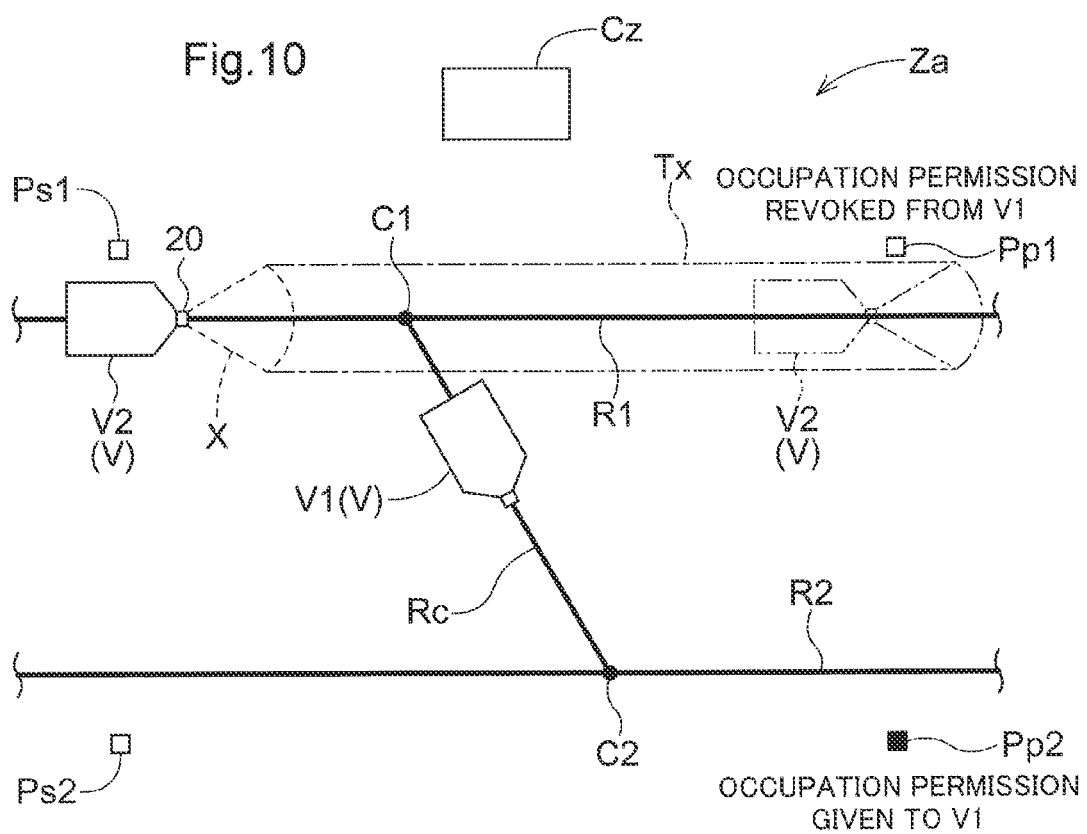

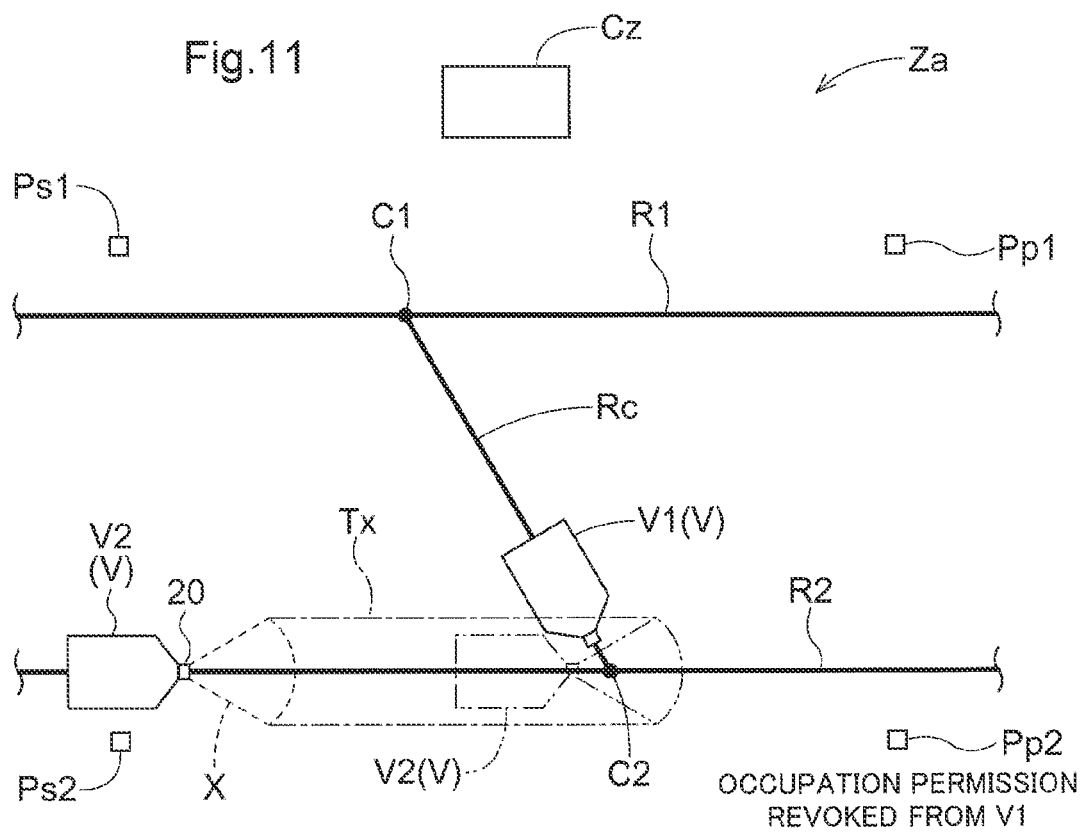
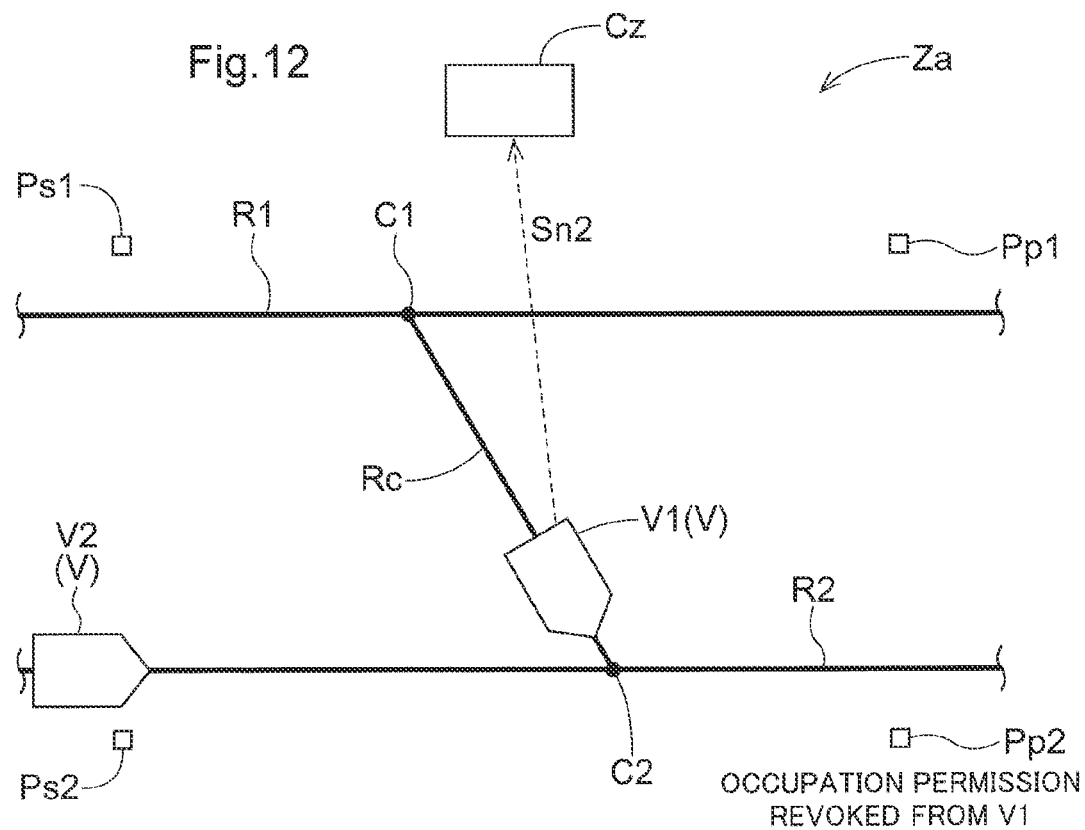

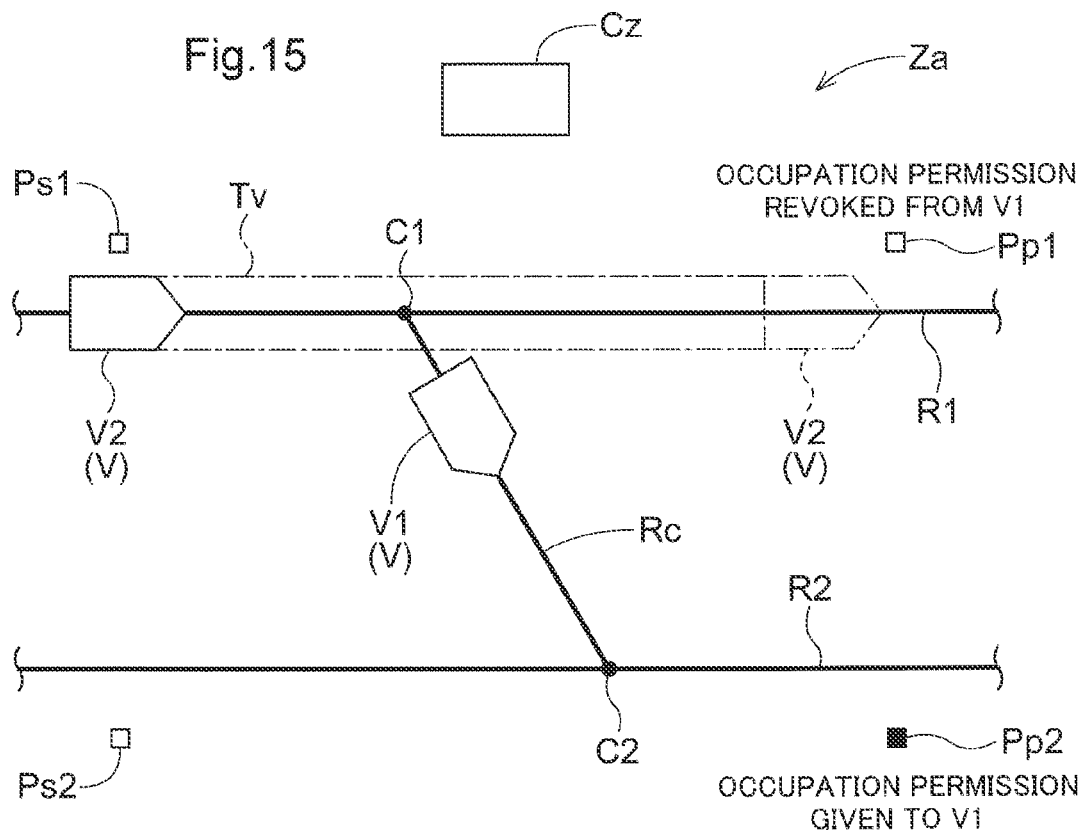
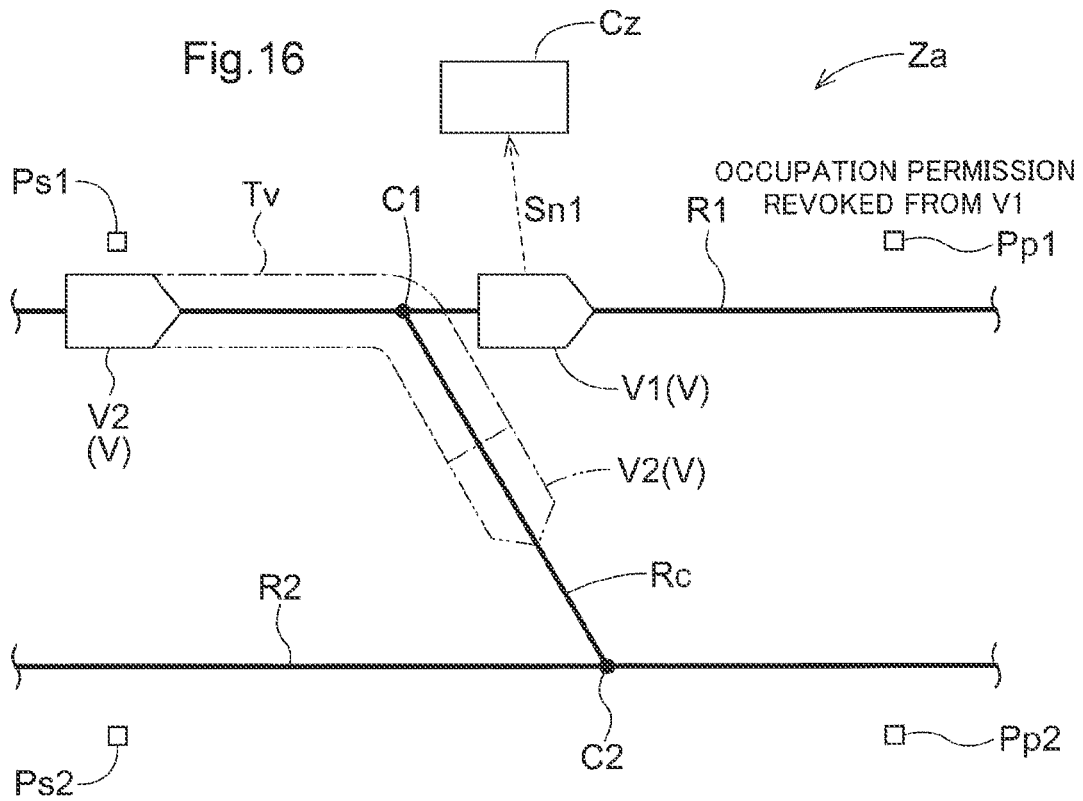

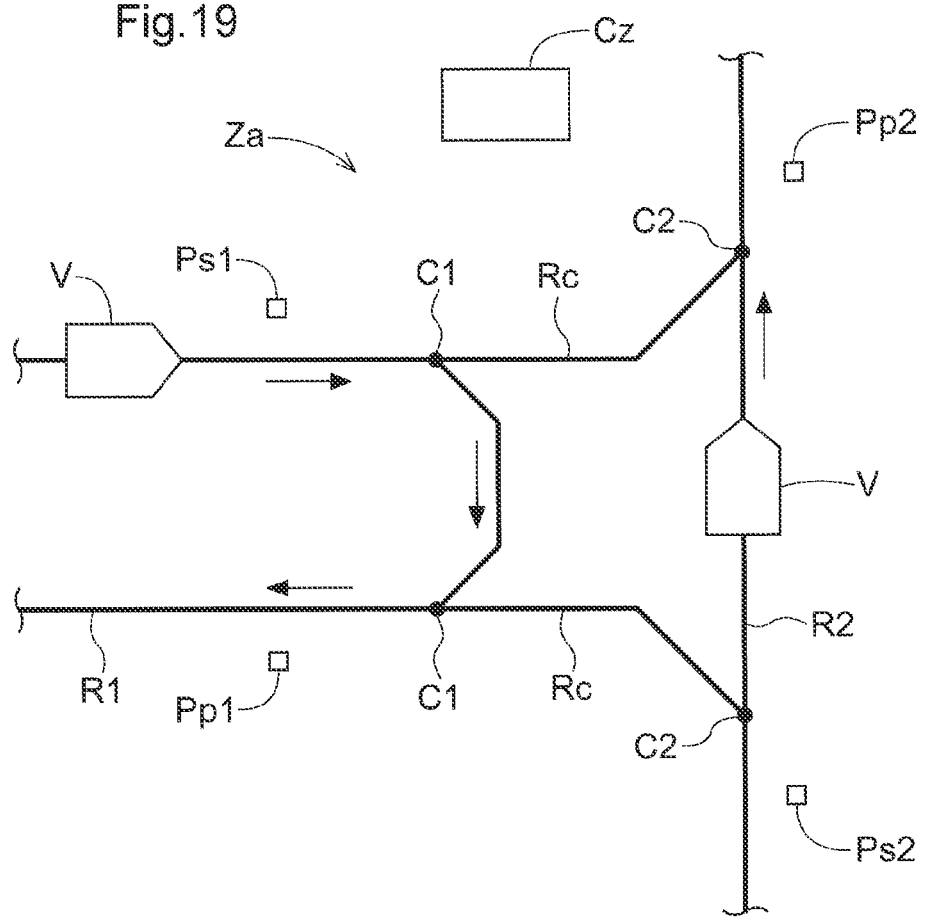

ARTICLE TRANSPORT FACILITY

CROSS-REFERENCE TO RELATED APPLICATION

This application claims priority to Japanese Patent Application No. 2023-041138 filed Mar. 15, 2023, the disclosure of which is hereby incorporated by reference in its entirety.

BACKGROUND OF THE INVENTION

1. Field of the Invention

The present invention relates to an article transport facility that includes transport vehicles that transport articles, a travel route along which the transport vehicles travel, and a zone control device that controls the transport vehicles by giving passage permission to transport vehicles traveling in a specified zone in the travel route.

2. Description of Related Art

An example of such an article transport facility is disclosed as a transport cart system in JP 2006-313463A (Patent Document 1). In the following description of the related art, the symbols shown in parentheses are those used in Patent Document 1.

In the system disclosed in Patent Document 1, lock points are provided at branching points and merging points in a travel route of transport vehicles (5), zones each including a lock point are set (hereinafter, called "control zones"), and whether or not a transport vehicle (5) is permitted to pass at a lock point is determined for a zone as a whole.

Before a transport vehicle (5) enters a control zone in which a lock point is provided, the transport vehicle (5) issues, to a zone controller (11), a blocking request for prohibiting another transport vehicle (5) from entering the control zone. If the zone controller (11) permits the transport vehicle (5) that issued the blocking request to pass through the control zone, blocking permission is given, and the other transport vehicle (5) is prohibited from passing. After the transport vehicle (5) passes, the zone controller (11) cancels the blocking in the control zone so as to enable accepting the other transport vehicle (5).

In the system disclosed in Patent Document 1, whether or not a transport vehicle (5) is permitted to pass at a lock point is determined for a control zone as a whole, and therefore a plurality of transport vehicles (5) cannot exist in one control zone at the same time. Therefore, the efficiency of transport vehicle passage in that control zone is low, and if there are many of such control zones, there is a limit to how much the transport efficiency can be improved for the article transport facility as a whole.

SUMMARY OF THE INVENTION

In view of the aforementioned circumstances, there is desire to realize technology that can improve the transport efficiency in an article transport facility as a whole by improving the efficiency of transport vehicle passage in a zone that includes a branching point or a merging point in a travel route.

The following are aspects of technology for solving the foregoing problem.

An article transport facility according to an aspect includes:
a plurality of transport vehicles configured to transport an article;
a travel route travelable by the transport vehicles; and
a zone control device configured to control the transport vehicles by giving a first passage permission or a second passage permission to the transport vehicles traveling in a specified zone in the travel route,
wherein the specified zone includes:
a first route and a second route not intersecting each other; and
a connection route connecting a first connecting section in the first route to a second connecting section in the second route,
the first route and the second route are each a route along which the transport vehicles travel in one direction from an upstream side toward a downstream side,
the first route includes a first passing point downstream of the first connecting section,
the second route includes a second passing point downstream of the second connecting section,
the first route further includes, upstream of the first connecting section, a first stopping point at which the transport vehicles stop in response to not obtaining the first passage permission,
in response to giving the first passage permission to a transport vehicle among the plurality of transport vehicles, the zone control device gives permission to occupy the first passing point to the transport vehicle that obtained the first passage permission,
in response to giving the second passage permission to a transport vehicle among the plurality of transport vehicles, the zone control device gives permission to occupy the second passing point to the transport vehicle that obtained the second passage permission,
in order to travel from the first route or the second route to the connection route, the transport vehicles request both the first passage permission and the second passage permission from the zone control device,
in response to the zone control device receiving a request for both the first passage permission and the second passage permission from a transport vehicle among the plurality of transport vehicles, in a case where both the first passing point and the second passing point are in a non-occupied state, in which occupation permission has not been given to a preceding transport vehicle, the zone control device gives permission to occupy both the first passing point and the second passing point to the transport vehicle that requested both the first passage permission and the second passage permission,
each of the transport vehicles includes a travel distance detector configured to detect a travel distance,
the travel distance detector has set therein a first set distance and a second set distance as travel distances from the first stopping point, and
in a case where a specified transport vehicle, which is one of the plurality of transport vehicles, receives both the first passage permission and the second passage permission and is to pass through the second passing point, (i) in response to the travel distance of the specified transport vehicle from the first stopping point reaching the first set distance, the specified transport vehicle issues, to the zone control device, a first occupation revocation request for revoking permission to occupy the first passing point, and (ii) in response to the travel distance of the specified transport vehicle from the first stopping point reaching the second set distance, the specified transport vehicle issues, to the zone control device, a second occupation revocation request for revoking permission to occupy the second passing point.

In the specified zone described above, the first route and the second route do not intersect each other, and therefore if no transport vehicle passes through the connection route, transport vehicles can travel along the first route and the second route at the same time. According to this configuration, the determination regarding passage permission for a transport vehicle can be made separately for the first passing point provided in the first route and the second passing point provided in the second route. Therefore, in the case where a plurality of transport vehicles travel along the first route and the second route without passing through the connection route, the transport vehicles can be allowed to travel along the first route and the second route at the same time. Therefore, compared with the case where the determination regarding passage permission for transport vehicles is made for the specified zone as a whole, it is possible to allow the transport vehicles to travel through the specified zone more efficiently. On the other hand, in the case where a transport vehicle is to travel from the first route to the second route via the connection route or from the second route to the first route via the connection route, if both the first passing point and the second passing point are in the non-occupied state with respect to a preceding transport vehicle, the zone control device permits the transport vehicle to travel, and gives permission to occupy both the first passing point and the second passing point to the transport vehicle that was permitted to travel. Accordingly, it is possible to avoid interference between transport vehicles in the specified zone. As a result, it is possible to avoid the case where transport vehicles interfere with each other, and improve the transport efficiency of the article transport facility as a whole.

Also, according to the above configuration, a transport vehicle can issue the occupation revocation request upstream of a passing point, and in that case, occupation permission for the passing point can be revoked at an earlier time. This allows another transport vehicle to obtain permission to pass through that passing point at an earlier time. A plurality of transport vehicles can therefore travel smoothly in the specified zone. Also, according to the above configuration, the transport vehicle issues the occupation revocation request based on the travel distance detected by the travel distance detector, and therefore a member such as a marker indicating a reference point for issuing an occupation revocation request does not need to be disposed along the travel route. This facilitates simplifying the article transport facility.

Further features and advantages of the technology according to the present disclosure will become clearer from the following description of illustrative and non-limiting embodiments given with reference to the drawings.

BRIEF DESCRIPTION OF THE DRAWINGS

FIG. 6 is an illustrative diagram showing a case in which a transport vehicle travels along a first route.
FIG. 7 is an illustrative diagram showing a case in which a transport vehicle travels along a second route.
FIG. 8 is an illustrative diagram showing a case in which a transport vehicle travels from the first route to the second route via a connection route.
FIG. 9 is an illustrative diagram showing a first set distance and a second set distance.
FIG. 10 is a diagram showing an example of a condition for setting the first set distance.
FIG. 11 is a diagram showing an example of a condition for setting the second set distance.
FIG. 12 is an illustrative diagram showing a case in which a subsequent transport vehicle is given permission to occupy a second passing point.
FIG. 15 is a diagram showing another example of a condition for setting the first set distance.
FIG. 16 is a diagram showing another example of a condition for setting the first set distance.
FIG. 19 is a plan view showing a specified zone according to another embodiment.

DESCRIPTION OF THE INVENTION

Hereinafter, embodiments of an article transport facility will be described with reference to the drawings.

Figure 1:
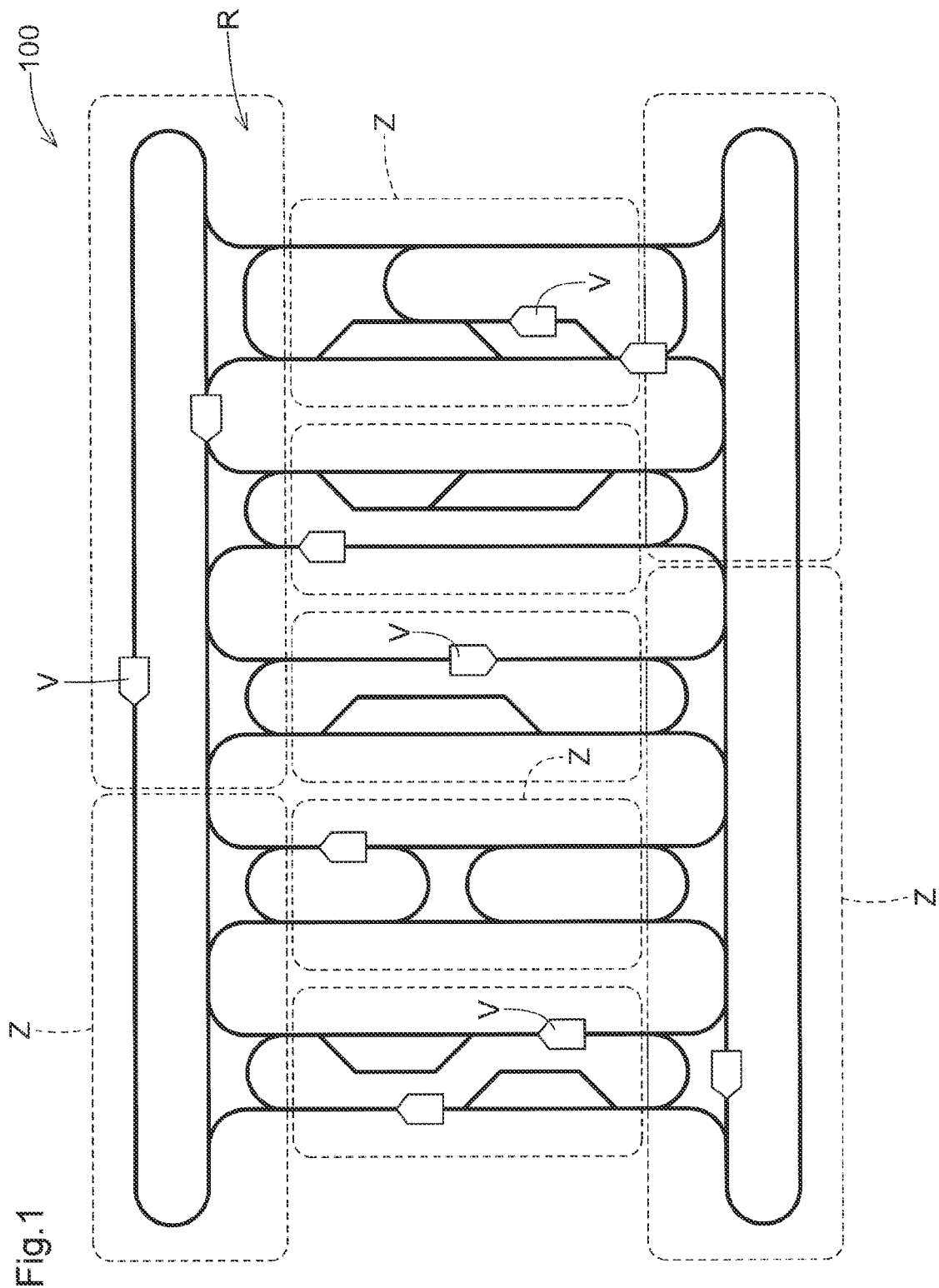
FIG. 1 is a plan view of an article transport facility.
Figure 2:
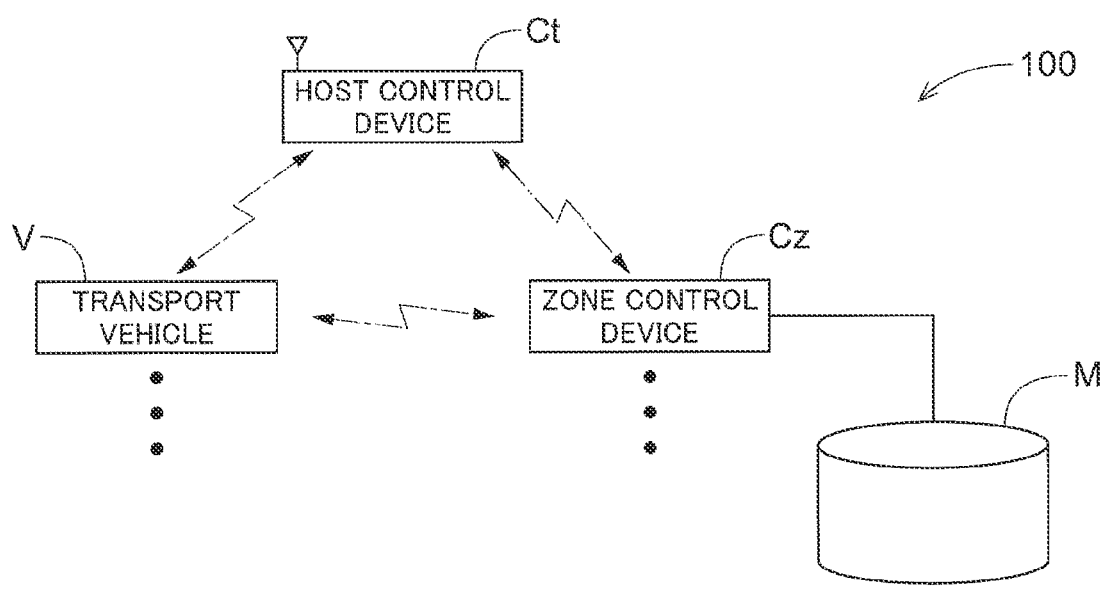
FIG. 2 is a control block diagram.

As shown in FIGS. 1 and 2, an article transport facility 100 includes transport vehicles V that transport articles, a travel route R along which the transport vehicles V travel, and a zone control device Cz that controls the transport vehicles V by giving passage permission Sp (see FIG. 5, etc.) to transport vehicles V traveling in a specified zone Za (see FIG. 3) in the travel route R.

In the present embodiment, the travel route R is divided into a plurality of control regions Z. Each of the control regions Z includes one or more specified zones Za (see FIG. 3). One zone control device Cz is provided for each of the control regions Z. In this example, each of the zone control devices Cz is configured to control transport vehicles V in the corresponding control region Z. More specifically, when a transport vehicle V attempts to pass through a specified zone Za (see FIG. 3) provided in a control region Z, the corresponding zone control device Cz determines whether or not to permit passage of the transport vehicle V.

In the present embodiment, the article transport facility 100 includes a host control device Ct. The host control device Ct controls the zone control devices Cz. The transport vehicles V, the zone control devices Cz, and the host control device Ct are able to communicate with each other.

In the present embodiment, the article transport facility 100 includes a plurality of transport vehicles V. Each of the transport vehicles V is configured to execute a task based on a transport command received from the host control device Ct. Examples of the transport vehicles V include unmanned transport vehicles that travel along the floor, and overhead transport vehicles that travel along the ceiling.

Various types of articles are handled in the article transport facility 100. For example, in the case where the article transport facility 100 is used in a semiconductor manufacturing factory, the article is a wafer storage container (a so-called FOUP: Front Opening Unified Pod) that stores wafers, a reticle storage container (a so-called reticle pod) that stores reticles, or the like. In this case, the transport vehicles V transport articles such as wafer storage containers or reticle storage containers along the travel route R between processes.

The host control device Ct controls the transport vehicles V and the zone control devices Cz. For example, the host control device Ct issues, to the transport vehicles V, transport commands specifying a transport source and a transport destination for an article. The host control device Ct is able to communicate with the transport vehicles V, and can be aware of the current positions of the transport vehicles V by receiving current position information Iv (see FIG. 4) from the transport vehicles V. Also, the host control device Ct is able to communicate with the zone control devices Cz, and can be aware of the situation in the control regions Z and the specified zones Za by receiving status reports (reports on traffic conditions or the like) regarding the control regions Z and the specified zones Za from the zone control devices Cz.

Figure 3:
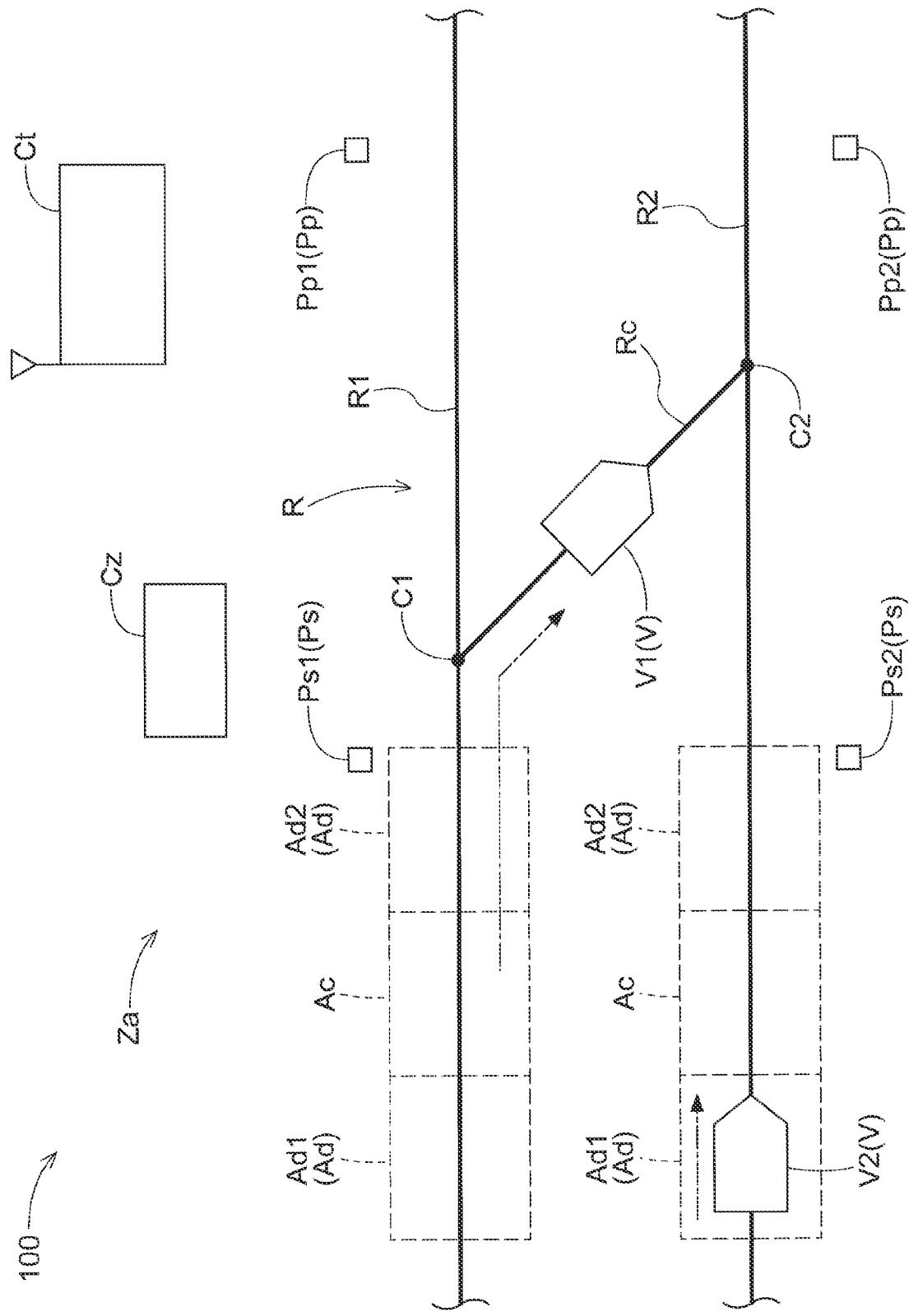
FIG. 3 is a diagram showing control of transport vehicles traveling in a specified zone.

Each of the zone control devices Cz controls transport vehicles V traveling in the specified zone Za in the corresponding control region Z. Specifically, the zone control device Cz causes the transport vehicles V to travel without interfering with each other in the specified zone Za. For example, FIG. 3 shows a state in which two transport vehicles V (one is a first transport vehicle V1 and the other is a second transport vehicle V2) are traveling in the specified zone Za. In the case where the first transport vehicle V1 and the second transport vehicle V2 are scheduled to pass through the same merging point in the specified zone Za, the zone control device Cz causes the first transport vehicle V1 and the second transport vehicle V2 to pass at different timings. In the example shown in FIG. 3, the zone control device Cz causes the first transport vehicle V1 to pass through the merging point first, and causes the second transport vehicle V2 to decelerate or stop so as to pass through the merging point after the first transport vehicle V1, thus controlling the traveling of the transport vehicles. As will be described later, the zone control device Cz gives passage permission Sp (see FIG. 5, for example) to a transport vehicle V that is to pass through the specified zone Za.

The host control device Ct and the zone control devices Cz each include a processor such as a microcomputer and peripheral circuits such as a memory, for example. Various types of processing and functions are realized by cooperation between such hardware and programs executed on the processor of a computer or the like. The article transport facility 100 is provided with a control system that includes at least the host control device Ct and the zone control devices Cz. This control system may include other control devices in addition to the host control device Ct and the zone control devices Cz.

As shown in FIG. 3, the specified zone Za includes a first route R1 and a second route R2 that do not intersect with each other, and a connection route Rc that connects a first connecting section C1 in the first route R1 to a second connecting section C2 in the second route R2. The first route R1 and the second route R2 are routes along which the transport vehicles V travel in one direction from the upstream side to the downstream side.

In the present embodiment, the first route R1 and the second route R2 are arranged parallel to each other in plan view. The connection route Rc that connects the first route R1 and the second route R2 is arranged so as to be inclined relative to both the first route R1 and the second route R2. In other words, in this example, the first route R1, the second route R2, and the connection route Rc form an "N" shape in plan view.

Passing points Pp, which are each a guide to indicate that the transport vehicle V has passed through the specified zone Za, are set at the final end of the specified zone Za, that is to say at the downstream end of the specified zone Za. The passing points Pp include a first passing point Pp1 and a second passing point Pp2. The first passing point Pp1 is set downstream of the first connecting section C1 in the first route R1. The second passing point Pp2 is set downstream of the second connecting section C2 in the second route R2. Specifically, in the present embodiment, a passing point Pp through which a transport vehicle V passes if the passage permission Sp was obtained (see FIG. 5, for example), is set at both a location downstream of the first connecting section C1 in the first route R1 and a location downstream of the second connecting section C2 in the second route R2.

In the present embodiment, stopping points Ps, which are each a guide to indicate that the transport vehicle V is to stop before the specified zone Za, are set at the starting end of the specified zone Za, that is to say at the upstream end of the specified zone Za. The stopping points Ps include a first stopping point Ps1 and a second stopping point Ps2. The first stopping point Ps1 is set upstream of the first connecting section C1 in the first route R1. The second stopping point Ps2 is set upstream of the second connecting section C2 in the second route R2. In this way, in the present embodiment, a stopping point Ps at which a transport vehicle V stops if the passage permission Sp is not obtained (see FIG. 5, for example), is set at both a location upstream of the first connecting section C1 in the first route R1 and a location upstream of the second connecting section C2 in the second route R2.

In the present embodiment, a deceleration zone Ad, which is a zone in which a transport vehicle V decelerates in order to stop at the corresponding stopping point Ps, is set upstream of the stopping points Ps in the first route R1 and the second route R2. In the case where a transport vehicle V does not obtain the passage permission Sp and is to stop at a stopping point Ps, the transport vehicle V decelerates in the deceleration zone Ad and then stops at the stopping point Ps.

In the present embodiment, constant speed zones Ac are set in addition to the deceleration zones Ad. Specifically, a constant speed zone Ac, which is a zone in which a transport vehicle V travels at a constant speed before stopping at the corresponding stopping point Ps, is set upstream of the stopping points Ps in the first route R1 and the second route R2. In the case where a transport vehicle V does not obtain the passage permission Sp and is to stop at a stopping point Ps, the transport vehicle V travels at a constant speed in the constant speed zone Ac, then decelerates in the deceleration zone Ad, and then stops at the stopping point Ps. The deceleration zone Ad is arranged at a position adjacent to the upstream side of the corresponding stopping point Ps, and a constant speed zone Ac or another deceleration zone Ad may optionally be arranged further upstream of the deceleration zone Ad.

In the present embodiment, the deceleration zones Ad include a first deceleration zone Ad1 and a second deceleration zone Ad2. In the example shown in FIG. 3, in both the first route R1 and the second route R2, the first deceleration zone Ad1, which is a zone in which the transport vehicle V decelerates in order to stop at the corresponding stopping point Ps, is set upstream of the stopping point Ps;

the constant speed zone Ac, which is a zone in which the transport vehicle V travels at a constant speed, is set adjacent to the downstream side of the first deceleration zone Ad1; and the second deceleration zone Ad2, which is a section in which the transport vehicle V decelerates in order to stop at the stopping point Ps, is set adjacent to the downstream side of the constant speed zone Ac. The stopping point Ps is set at a position adjacent to the downstream side of the second deceleration zone Ad2. A creep zone, in which the transport vehicle V creeps (travels at a slow speed), may be set between the second deceleration zone Ad2 and the stopping point Ps.

As described above, the zone control devices Cz each give the passage permission Sp (see FIG. 5, for example) to a transport vehicle V that is to pass through the corresponding specified zone Za. Accordingly, a transport vehicle V that obtained the passage permission Sp can pass through the specified zone Za, and a transport vehicle V that has not obtained the passage permission Sp can be stopped on the upstream side of the specified zone Za.

The passage permission Sp includes a first passage permission Sp1 and a second passage permission Sp2 (see FIGS. 6 to 8). When the zone control device Cz gives the first passage permission Sp1 to a transport vehicle V, the zone control device Cz allows that transport vehicle V to occupy the first passing point Pp1. When the zone control device Cz gives the second passage permission Sp2 to a transport vehicle V, the zone control device Cz allows that transport vehicle V to occupy the second passing point Pp2.

In the present embodiment, upon obtaining the passage permission Sp from the zone control device Cz, the transport vehicle V passes through the first passing point Pp1 or the second passing point Pp2, and then issues an occupation revocation request Sn (see FIG. 5, for example) to the zone control device Cz. Upon receiving the occupation revocation request Sn, the zone control device Cz revokes the permission given to the transport vehicle V that issued the occupation revocation request Sn, for the passing point Pp pertaining to the occupation revocation request Sn. Accordingly, the zone control device Cz that received the occupation revocation request Sn can accept the next transport vehicle V into the specified zone Za.

The occupation revocation request Sn includes a first occupation revocation request Sn1 and a second occupation revocation request Sn2. In the present embodiment, the transport vehicle V issues, to the zone control device Cz, the first occupation revocation request Sn1 (see FIG. 6, for example) for revoking permission to occupy the first passing point Pp1. The transport vehicle V issues, to the zone control device Cz, the second occupation revocation request Sn2 (see FIG. 7, for example) for revoking permission to occupy the second passing point Pp2. For example, the transport vehicle V issues the first occupation revocation request Sn1 after passing through the first passing point Pp1. As a result, the zone control device Cz revokes the permission for the transport vehicle V to occupy the first passing point Pp1, and becomes ready to accept another transport vehicle V. As another example, the transport vehicle V issues the second occupation revocation request Sn2 after passing through the second passing point Pp2. As a result, the zone control device Cz revokes the permission for the transport vehicle V to occupy the second passing point Pp2, and becomes ready to accept another transport vehicle V. Note that hereinafter, the first occupation revocation request Sn1 and the second occupation revocation request Sn2 may be collectively referred to as simply the "occupation revocation request Sn."

Here, there may be cases where the zone control device Cz does not receive a subsequent response (in this example, the occupation revocation request Sn) from a transport vehicle V to which the passage permission Sp was given. This situation can occur due to a communication failure, a malfunction, or the like. If the zone control device Cz does not receive a response from the transport vehicle V, the presence or absence of the transport vehicle V becomes unclear.

Figure 4:
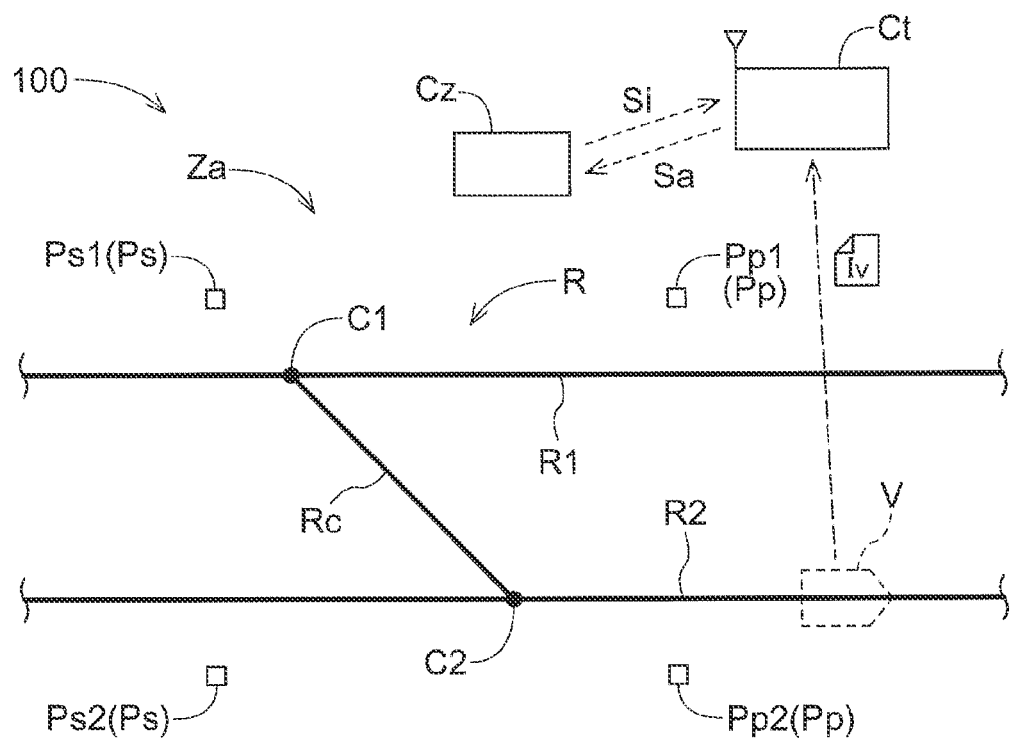
FIG. 4 is a diagram showing control of transport vehicles traveling in a specified zone.

In view of this, as shown in FIG. 4, in the present embodiment, if the zone control device Cz does not receive a subsequent response (occupation revocation request Sn) from a transport vehicle V to which the passage permission Sp was given, the zone control device Cz issues an inquiry Si to the host control device Ct. In this example, after giving the passage permission Sp to the transport vehicle V, if the zone control device Cz does not receive a response (occupation revocation request Sn) from the transport vehicle V before the elapse of a predetermined period, the zone control device Cz issues the inquiry Si to the host control device Ct. This "predetermined period" is appropriately determined based on the traveling distance of the transport vehicle V, the traveling speed of the transport vehicle V, or the like in the specified zone Za.

In the present embodiment, upon receiving the inquiry Si from the zone control device Cz, the host control device Ct determines whether or not the transport vehicle V passed through the first passing point Pp1 or the second passing point Pp2 based on the presence or absence of transport vehicles V in the specified zone Za. In this example, upon receiving the inquiry Si, the host control device Ct checks the presence or absence of transport vehicles V in the specified zone Za based on current position information Iv acquired from transport vehicles V, and issues a response Sa regarding the check result to the zone control device Cz. Upon receiving the response Sa, the zone control device Cz continues to control the transport vehicles V in the specified zone Za based on the presence or absence of transport vehicles V in the specified zone Za indicated in the response Sa. According to the above configuration, even if a response is not received from a transport vehicle V, through cooperation between the zone control device Cz and the host control device Ct, the zone control device Cz can more appropriately control the transport vehicles V in the specified zone Za. In this example, the above-described cooperation for determining whether or not a transport vehicle V has passed through the first passing point Pp1 or the second passing point Pp2 is performed by the host control device Ct only if the inquiry Si is received from the zone control device Cz. By causing the zone control device Cz and the host control device Ct to operate in cooperation only when necessary, it is possible to reduce the processing load on the host control device Ct while also appropriately controlling the transport vehicles V in the specified zone Za.

The following is a detailed description of control performed in the specified zone Za.

Figure 5:
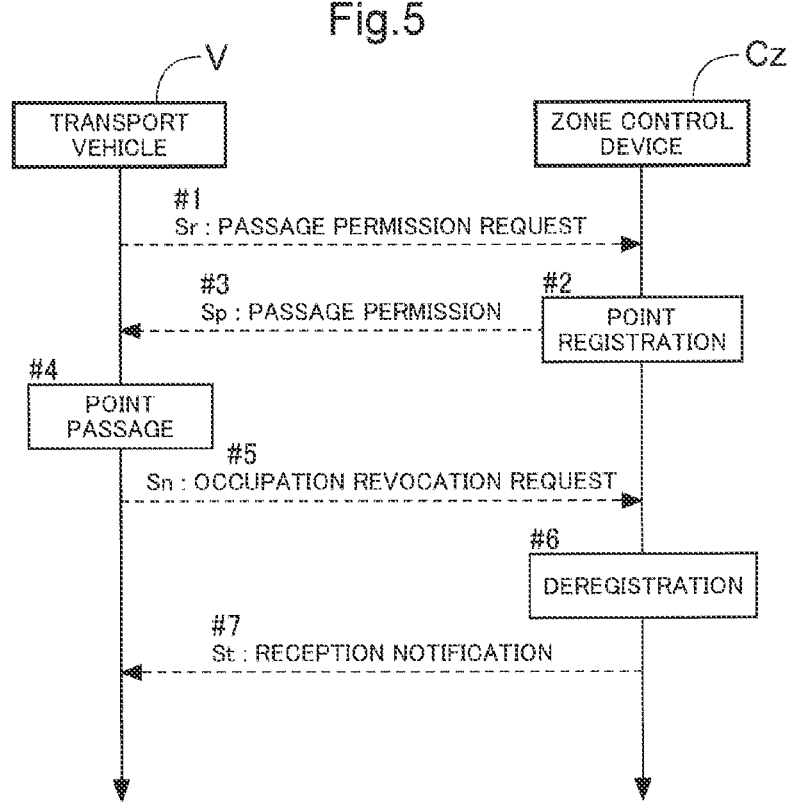
FIG. 5 is a flowchart.

As shown in FIG. 5, in the case of attempting to pass through the specified zone Za, or more specifically a passing point Pp, a transport vehicle V issues a passage permission request Sr in order to request permission to pass (step #1). In the present embodiment, the transport vehicle V issues the passage permission request Sr to the zone control device Cz from a position on the upstream side of the specified zone Za (specifically, from the first connecting section C1 or the second connecting section C2).

Upon determining that the transport vehicle V that issued the passage permission request Sr can be allowed to pass through the specified zone Za, the zone control device Cz registers the passing point Pp that pertains to the passage permission request Sr in order to give occupation permission to the transport vehicle V that issued the passage permission request Sr (step #2), and at the same time gives the passage permission Sp to that transport vehicle V (step #3). Note that the zone control device Cz determines whether the passing point Pp pertaining to the passage permission request Sr is in an occupied state in which occupation permission has been given to another transport vehicle V preceding the transport vehicle V that issued the passage permission request Sr, or in a non-occupied state in which occupation permission has not been given. If the passing point Pp is in the non-occupied state, the zone control device Cz determines that the transport vehicle V that issued the passage permission request Sr can be allowed to pass through the passing point Pp. In this example, the zone control device Cz includes a storage unit M that stores occupancy state information indicating whether the passing points Pp are each in the occupied state or the non-occupied state (see FIG. 2). The zone control device Cz gives the passage permission Sp to a transport vehicle V based on the occupancy state information stored in the storage unit M. Furthermore, the zone control device Cz can update the occupancy state information stored in the storage unit M at any time in accordance with the state of the specified zone Za.

Upon receiving the passage permission Sp, the transport vehicle V passes through the specified zone Za, more specifically the corresponding passing point Pp (step #4), and after completing the passage, issues the occupation revocation request Sn to the zone control device Cz (step #5). Note that as described later, the transport vehicle V may issue the occupation revocation request Sn to the zone control device Cz before passing through the passing point Pp.

Upon receiving the occupation revocation request Sn, the zone control device Cz deregisters the passing point Pp for which occupation permission was given to the transport vehicle V that issued the occupation revocation request Sn (step #6). As a result, the deregistered passing point Pp enters the non-occupied state, and the zone control device Cz becomes able to accept the next transport vehicle V at the passing point Pp.

After receiving the occupation revocation request Sn from the transport vehicle V, the zone control device Cz issues, to the corresponding transport vehicle V, a reception notification St indicating reception of the occupation revocation request Sn. By receiving the reception notification St from the zone control device Cz, the transport vehicle V can recognize that the occupation revocation request Sn issued by the transport vehicle V was received by the zone control device Cz. For example, if the transport vehicle V does not receive the reception notification St due to a communication failure or the like, the transport vehicle V again issues the occupation revocation request Sn to the zone control device Cz.

In the present embodiment, after deregistering the passing point Pp for which occupation permission was given to the transport vehicle V that issued the occupation revocation request Sn (step #6), the zone control device Cz issues the reception notification St to the transport vehicle V (step #7). However, the issuing of the reception notification St from the zone control device Cz to the transport vehicle V is performed not on the condition that the passing point Pp was deregistered, but rather merely on the condition that the zone control device Cz received the occupation revocation request Sn from the transport vehicle V. Therefore, the zone control device Cz may issue the reception notification St to the transport vehicle V before deregistering the passing point Pp, or may issue the reception notification St to the transport vehicle V after deregistering the passing point Pp.

Note that the passage permission request Sr, the passage permission Sp, the occupation revocation request Sn, and the reception notification St described above are transmitted and received between the zone control device Cz and the transport vehicle V as signals. For example, the passage permission request Sr is transmitted and received as a passage request signal. The passage permission Sp is transmitted and received as a passage permission signal. The occupation revocation request Sn is transmitted and received as an occupation revocation request signal. The reception notification St is transmitted and received as a reception notification signal.

FIGS. 6 to 8 show examples in which a transport vehicle V passes through a specified zone Za under the control of a zone control device Cz. FIG. 6 shows, as Example 1, a case in which the transport vehicle V passes through the first connecting section C1 and travels along the first route R1. FIG. 7 shows, as Example 2, a case in which the transport vehicle V passes through the second connecting section C2 and travels along the second route R2. FIG. 8 shows, as Example 3, a case in which the transport vehicle V travels from the first route R1 to the second route R2 via the connection route Rc.

Example 1

As shown in FIG. 6, in order to pass through the first connecting section C1 and travel along the first route R1, at a position on the upstream side of the first connecting section C1, the transport vehicle V requests the first passage permission Sp1, which is the passage permission Sp for passing through the first passing point Pp1, from the zone control device Cz. In this example, the transport vehicle V requests the zone control device Cz for the first passage permission Sp1 from a position upstream of the first stopping point Ps1 in the first route R1. Then, if the first passage permission Sp1 is obtained, the transport vehicle V passes through the first connecting section C1 and travels toward the first passing point Pp1, whereas if the first passage permission Sp1 is not obtained, the transport vehicle V stops upstream of the first connecting section C1.

As shown in (a) in FIG. 6, in the present embodiment, in the case of attempting to pass through the first passing point Pp1, the transport vehicle V issues the first passage permission request Sr1 to the zone control device Cz. Upon receiving the first passage permission request Sr1 from the transport vehicle V, the zone control device Cz checks whether permission to occupy the first passing point Pp1 has been given to a preceding transport vehicle V, and if occupation permission has not been given, determines that the transport vehicle V that issued the first passage permission request Sr1 can be allowed to pass through the first passing point Pp1. In other words, the zone control device Cz determines whether the first passing point Pp1 is in the occupied state or the non-occupied state, and if in the non-occupied state, the zone control device Cz determines that the transport vehicle V can be allowed to pass through the first passing point Pp1. The zone control device Cz then issues the first passage permission Sp1 to the transport vehicle V that issued the first passage permission request Sr1.

In the present embodiment, in the case where the zone control device Cz has given the first passage permission Sp1 to the transport vehicle V, the zone control device Cz allows the transport vehicle V to occupy the first passing point Pp1 pertaining to the first passage permission Sp1. As a result, the first passing point Pp1 enters the occupied state with respect to the transport vehicle V. In this example, the zone control device Cz registers the first passing point Pp1 pertaining to the first passage permission Sp1 in order to allow the transport vehicle V to occupy the first passing point Pp1. Accordingly, the zone control device Cz can exclude other transport vehicles V so as to prevent other transport vehicles V from passing through the first passing point Pp1.

As shown in (b) of FIG. 6, in the present embodiment, after passing through the first passing point Pp1, the transport vehicle V issues the first occupation revocation request Sn1 to the zone control device Cz. After receiving the first occupation revocation request Sn1 from the transport vehicle V, the zone control device Cz revokes permission for the transport vehicle V to occupy the first passing point Pp1 pertaining to the first occupation revocation request Sn1. As a result, the first passing point Pp1 enters the non-occupied state. In this example, upon receiving the first occupation revocation request Sn1, the zone control device Cz deregisters the first passing point Pp1 for which occupation permission was given to the transport vehicle V that issued the first occupation revocation request Sn1. As a result, the permission for the transport vehicle V to occupy the first passing point Pp1 is revoked, and another transport vehicle V can be accepted.

Example 2

As shown in FIG. 7, in order to pass through the second connecting section C2 and travel along the second route R2, at a position on the upstream side of the second connecting section C2, the transport vehicle V requests the second passage permission Sp2, which is the passage permission Sp for passing through the second passing point Pp2, from the zone control device Cz. In this example, the transport vehicle V requests the zone control device Cz for the second passage permission Sp2 from a position upstream of the second stopping point Ps2 in the second route R2. Then, if the second passage permission Sp2 is obtained, the transport vehicle V passes through the second connecting section C2 and travels toward the second passing point Pp2, whereas if the second passage permission Sp2 is not obtained, the transport vehicle V stops upstream of the second connecting section C2.

As shown in (a) in FIG. 7, in the present embodiment, in the case of attempting to pass through the second passing point Pp2, the transport vehicle V issues the second passage permission request Sr2 to the zone control device Cz. Upon receiving the second passage permission request Sr2 from the transport vehicle V, the zone control device Cz checks whether permission to occupy the second passing point Pp2 has been given to a preceding transport vehicle V, and if occupation permission has not been given, determines that the transport vehicle V that issued the second passage permission request Sr2 can be allowed to pass through the second passing point Pp2. In other words, the zone control device Cz determines whether the second passing point Pp2 is in the occupied state or the non-occupied state, and if in the non-occupied state, the zone control device Cz determines that the transport vehicle V can be allowed to pass through the second passing point Pp2. The zone control device Cz then issues the second passage permission Sp2 to the transport vehicle V that issued the second passage permission request Sr2.

In the present embodiment, in the case where the zone control device Cz has given the second passage permission Sp2 to the transport vehicle V, the zone control device Cz allows the transport vehicle V to occupy the second passing point Pp2 pertaining to the second passage permission Sp2. As a result, the second passing point Pp2 enters the occupied state with respect to the transport vehicle V. In this example, the zone control device Cz registers the second passing point Pp2 pertaining to the second passage permission Sp2 in order to allow the transport vehicle V to occupy the second passing point Pp2. Accordingly, the zone control device Cz can exclude other transport vehicles V so as to prevent other transport vehicles V from passing through the second passing point Pp2.

As shown in (b) of FIG. 7, in the present embodiment, after passing through the second passing point Pp2, the transport vehicle V issues the second occupation revocation request Sn2 to the zone control device Cz. After receiving the second occupation revocation request Sn2 from the transport vehicle V, the zone control device Cz revokes permission for the transport vehicle V to occupy the second passing point Pp2 pertaining to the second occupation revocation request Sn2. As a result, the second passing point Pp2 enters the non-occupied state. In this example, upon receiving the second occupation revocation request Sn2, the zone control device Cz deregisters the second passing point Pp2 for which occupation permission was given to the transport vehicle V that issued the second occupation revocation request Sn2. As a result, the permission for the transport vehicle V to occupy the second passing point Pp2 is revoked, and another transport vehicle V can be accepted.

Example 3

As shown in FIG. 8, in the case of travel from the first route R1 or the second route R2 to the connection route Rc, at a position on the upstream side of the first connecting section C1 or the second connecting section C2, the transport vehicle V requests both the first passage permission Sp1 and the second passage permission Sp2 from the zone control device Cz. Upon receiving, from the transport vehicle V, a request for permission to travel from the first route R1 or the second route R2 to the connection route Rc, if both the first passing point Pp1 and the second passing point Pp2 are in the non-occupied state with respect to a preceding transport vehicle V, the zone control device Cz permits the transport vehicle V to travel from the first route R1 or the second route R2 to the connection route Rc, and gives permission to occupy both the first passing point Pp1 and the second passing point Pp2 to the transport vehicle V that was permitted to travel.

As illustrated in (a) in FIG. 8, in the case of attempting to travel from the first route R1 to the connection route Rc and pass through the second passing point Pp2, the transport vehicle V issues both the first passage permission request Sr1 and the second passage permission request Sr2 to the zone control device Cz. Upon receiving both the first passage permission request Sr1 and the second passage permission request Sr2 from the transport vehicle V, the zone control device Cz checks whether permission to occupy the first passing point Pp1 and permission to occupy the second passing point Pp2 have been given to a preceding transport vehicle V, and if neither occupation permission has been given, gives both the first passage permission Sp1 and the second passage permission Sp2 to the transport vehicle V that issued both the first passage permission request Sr1 and the second passage permission request Sr2. Note that this similarly applies to the case where the transport vehicle V attempts to travel from the second route R2 to the connection route Rc and pass through the first passing point Pp1. In other words, in this case as well, the transport vehicle V issues both the first passage permission request Sr1 and the second passage permission request Sr2 to the zone control device Cz. If both the first passing point Pp1 and the second passing point Pp2 are in the non-occupied state, the zone control device Cz gives both the first passage permission Sp1 and the second passage permission Sp2 to the transport vehicle V that issued both the first passage permission request Sr1 and the second passage permission request Sr2.

As illustrated in (b) in FIG. 8, after traveling from the first route R1 to the connection route Rc and passing through the second passing point Pp2 in the second route R2, the transport vehicle V issues both the first occupation revocation request Sn1 and the second occupation revocation request Sn2 to the zone control device Cz. In the present embodiment, after receiving both the first occupation revocation request Sn1 and the second occupation revocation request Sn2 from the transport vehicle V, the zone control device Cz revokes permission for the transport vehicle V to occupy the first passing point Pp1 and the second passing point Pp2. As a result, both the first passing point Pp1 and the second passing point Pp2 enter the non-occupied state. In this example, upon receiving both the first occupation revocation request Sn1 and the second occupation revocation request Sn2, the zone control device Cz deregisters the first passing point Pp1 and the second passing point Pp2 for which occupation permission was given to the transport vehicle V that issued both the first occupation revocation request Sn1 and the second occupation revocation request Sn2. As a result, the permission for the transport vehicle V to occupy the first passing point Pp1 and the second passing point Pp2 is revoked, and other transport vehicles V can be accepted. Note that after traveling from the second route R2 to the connection route Rc and passing through the first passing point Pp1 in the first route R1, the transport vehicle V similarly issues the first occupation revocation request Sn1 and the second occupation revocation request Sn2 to the zone control device Cz. Then, after receiving both the first occupation revocation request Sn1 and the second occupation revocation request Sn2 from the transport vehicle V, the zone control device Cz revokes the permission for the transport vehicle V to occupy the first passing point Pp1 and the second passing point Pp2.

In this way, in order to pass through a branching or merging point while traveling along the first route R1, the transport vehicle V requests the zone control device Cz for only the first passage permission Sp1 for passing through the first passing point Pp1, and in order to pass through a branching or merging point while traveling along the second route R2, the transport vehicle V requests the zone control device Cz for only the second passage permission Sp2 for passing through the second passing point Pp2. If the passing point Pp for which permission was requested is in the non-occupied state, the zone control device Cz gives permission to occupy the passing point Pp to the transport vehicle V that requested permission. According to such a configuration, in the case where a plurality of transport vehicles V are to travel along the first route R1 or the second route R2 without passing through the connection route Rc, the transport vehicles V can be allowed to travel along the first route R1 and the second route R2 at the same time. Therefore, compared with the case where the determination regarding passage permission for the transport vehicles V is made for the specified zone Za as a whole, the transport vehicles V can pass through the specified zone Za more efficiently.

In the case of traveling through the connection route Rc to change the travel route between the first route R1 and the second route R2, the transport vehicle V needs to pass through both the first passing point Pp1 and the second passing point Pp2, and thus requests both the first passage permission Sp1 and the second passage permission Sp2 from the zone control device Cz. In this case, if both the first passing point Pp1 and the second passing point Pp2 are in the non-occupied state, the zone control device Cz gives travel permission to the transport vehicle V that requested permission, and allows that transport vehicle to occupy both the first passing point Pp1 and the second passing point Pp2. According to such a configuration, it is easier to avoid interference between transport vehicles V in the specified zone Za.

More specifically, in the present embodiment, after giving the passage permission Sp to a transport vehicle V, the zone control device Cz cannot determine the location of that transport vehicle V until the occupation revocation request Sn is received from the transport vehicle V. Therefore, for example, in the case of being scheduled to travel from the first route R1 to the second route R2 through the connection route Rc, even if the transport vehicle V stops midway for some reason after receiving the passage permission Sp from the zone control device Cz, the zone control device Cz cannot determine the position where the transport vehicle V stopped. In the case where the position where the transport vehicle V stopped is in the first connecting section C1 or in the first route R1 upstream of the first connecting section C1, if a subsequent transport vehicle V is allowed to travel along the first route R1, that transport vehicle will interfere with the stopped transport vehicle V. Furthermore, in the case where the position where the transport vehicle V stopped is close to the first connecting section C1 in the connection route Rc, interference may occur between the stopped transport vehicle V and a subsequent transport vehicle V. Therefore, in the case where the transport vehicle V has an influence on both the first route R1 and the second route R2 due to passing through the connection route Rc, regardless of whether the destination passing point Pp is the first passing point Pp1 or the second passing point Pp2, occupation permission is needed for both the first passing point Pp1 and the second passing point Pp2. According to this configuration, in the above case, the transport vehicle V is allowed to occupy both the first passing point Pp1 and the second passing point Pp2, and therefore even if the transport vehicle V stops midway, the subsequent transport vehicle V can be stopped at the stopping point Ps. Therefore, interference between the transport vehicles V can be avoided.

Next, an example will be described in which the transport vehicle V issues the occupation revocation request Sn to the zone control device Cz based on the travel distance. Specifically, in the example described below, the occupation revocation request Sn is issued regardless of whether the transport vehicle V has passed through a passing point Pp.

As shown in FIG. 9, each of the transport vehicles V includes a travel distance detector 10 that detects the distance traveled by the transport vehicle V. For example, the travel distance detector 10 detects the travel distance based on the rotation of the wheels. A known device such as a rotary encoder can be used as the travel distance detector 10. Although details are omitted, an information holding member is disposed at a specified point (here, a plurality of points) along the travel route R. For example, the information holding members are disposed on a rail that constitutes the travel route R or on a member whose position relative to the rail is fixed. Examples of the information holding member include a one-dimensional code, a two-dimensional code, and a wireless tag. The information holding member holds information (position information) regarding the position where the information holding member is disposed. The transport vehicle V includes a reading device that reads the position information held by the information holding members, and can recognize its own travel position based on the position information read by the reading device.

In the present embodiment, the transport vehicle V includes a detection sensor 20 that detects a transport vehicle V located ahead. The detection sensor 20 detects a transport vehicle V located ahead in a detection range X, which is a range in front of the transport vehicle V provided with the detection sensor 20 (see FIG. 10, for example). When the detection sensor 20 detects a transport vehicle V located ahead, the transport vehicle V provided with the detection sensor 20 decelerates or stops, for example, in order to avoid a rear-end collision with the transport vehicle V located ahead. In other words, the detection sensor 20 is configured as a rear-end collision prevention sensor.

In the present embodiment, a first set distance D1 and a second set distance D2 longer than the first set distance D1 are set in advance as travel distances from the first stopping point Ps1. In this way, the first set distance D1 and the second set distance D2 are set to different values. For example, after the position information of the information holding member disposed at the first stopping point Ps1 has been read by the transport vehicle V, the travel distance of the transport vehicle V corresponds to the travel distance from the first stopping point Ps1. After the position information of an information holding member disposed at a different location than the first stopping point Ps1 is then read by the transport vehicle V, the result of the distance between the first stopping point Ps1 and the other location being added to or subtracted from the travel distance of the transport vehicle V corresponds to the travel distance from the first stopping point Ps1.

In the case where the transport vehicle V has been given both the first passage permission Sp1 and the second passage permission Sp2 and attempts to pass through the second passing point Pp2, when the travel distance from the first stopping point Ps1 reaches the first set distance D1, the transport vehicle V issues, to the zone control device Cz, the first occupation revocation request Sn1 for revoking permission to occupy the first passing point Pp1. Also, when the travel distance of the same transport vehicle V from the first stopping point Ps1 reaches the second set distance D2, the transport vehicle V issues, to the zone control device Cz, the second occupation revocation request Sn2 for revoking permission to occupy the second passing point Pp2. In other words, in the case where the transport vehicle V has been given both the first passage permission Sp1 and the second passage permission Sp2 and attempts to pass through the second passing point Pp2, the transport vehicle V first issues the first occupation revocation request Sn1, then continues to travel, and then issues the second occupation revocation request Sn2. In this way, the transport vehicle V issues a plurality of occupation revocation requests Sn to the zone control device Cz at different times.

In the present embodiment, the transport vehicle V issues the occupation revocation request Sn at a position upstream of the first passing point Pp1 and the second passing point Pp2. As a result, the permission to occupy the first passing point Pp1 and the second passing point Pp2 can be revoked at an earlier time, and the passage permission Sp to pass through the first passing point Pp1 and the second passing point Pp2 can be obtained by a subsequent transport vehicle V at an earlier time.

The first set distance D1 and the second set distance D2 are appropriately set based on the layout of the facility or based on the functions and structure of the transport vehicle V. Examples of conditions for setting the first set distance D1 and the second set distance D2 will be described below. Note that in order to facilitate understanding of the content of the following description, a preceding transport vehicle V will be referred to as a first transport vehicle V1, and a subsequent transport vehicle V will be referred to as a second transport vehicle V2.

FIG. 10 shows an example of a condition for setting the first set distance D1.

As shown in FIG. 10, in the present embodiment, the first set distance D1 is set such that when the preceding first transport vehicle V1 reaches a point corresponding to the first set distance D1 from the first stopping point Ps1 while traveling along the connection route Rc, the preceding first transport vehicle V1 is outside a locus Tx of the detection range X of the detection sensor 20 of the subsequent second transport vehicle V2 traveling forward along the first route R1.

The locus Tx of the detection range X of the detection sensor 20 of the subsequent second transport vehicle V2 traveling forward along the first route R1 is the locus anticipated to be drawn by the detection range X of the detection sensor 20 when the subsequent second transport vehicle V2 travels forward along the first route R1.

In the present embodiment, the detection range X of the detection sensor 20 is set to a range that is wider than the body of the transport vehicle V provided with the detection sensor 20 along at least the path width direction (direction orthogonal to the extending direction of the travel route R in plan view). Therefore, the locus Tx of the detection range X of the detection sensor 20 is larger than the travel locus of the transport vehicle V provided with the detection sensor 20 at least along the path width direction.

Upon reaching the first set distance D1 from the first stopping point Ps1, the preceding first transport vehicle V1 is outside the locus Tx of the detection range X of the detection sensor 20 of the subsequent second transport vehicle V2 traveling forward along the first route R1. Therefore, for example, if the preceding first transport vehicle V1 travels the first set distance D1 from the first stopping point Ps1, issues the first occupation revocation request Sn1, and then immediately stops due to a failure or the like, the subsequent second transport vehicle V2 traveling forward along the first route R1 does not detect the first transport vehicle V1. This makes it possible to prevent obstructing the traveling of the subsequent second transport vehicle V2.

When the preceding first transport vehicle V1 issues the first occupation revocation request Sn1, permission for the first transport vehicle V1 to occupy the first passing point Pp1 is revoked. Therefore, the subsequent second transport vehicle V2 can issue the first passage permission Sp1 to the zone control device Cz and obtain permission to occupy the first passing point Pp1. Note that while the travel distance of the preceding first transport vehicle V1 from the first stopping point Ps1 remains less than the second set distance D2, permission for the first transport vehicle V1 to occupy the second passing point Pp2 is maintained.

FIG. 11 shows an example of a condition for setting the second set distance D2. FIG. 11 shows a different situation from FIG. 10.

As shown in FIG. 11, in the present embodiment, the second set distance D2 is set such that when the preceding first transport vehicle V1 reaches a point corresponding to the second set distance D2 from the first stopping point Ps1 while traveling along the connection route Rc, the preceding first transport vehicle V1 is inside the locus Tx of the detection range X of the detection sensor 20 of the subsequent second transport vehicle V2 traveling forward along the second route R2.

The locus Tx of the detection range X of the detection sensor 20 of the subsequent second transport vehicle V2 traveling forward along the second route R2 is the locus anticipated to be drawn by the detection range X of the detection sensor 20 when the subsequent second transport vehicle V2 travels forward along the second route R2.

Upon reaching the second set distance D2 from the first stopping point Ps1, the preceding first transport vehicle V1 is inside the locus Tx of the detection range X of the detection sensor 20 of the subsequent second transport vehicle V2 traveling forward along the second route R2. In the illustrated example, a portion of the first transport vehicle V1 is located inside the locus Tx of the detection range X of the detection sensor 20 of the subsequent second transport vehicle V2. Note that, as described above, the locus Tx of the detection range X of the detection sensor 20 is the locus anticipated to be drawn by the detection range X of the detection sensor 20 when the subsequent second transport vehicle V2 travels. Therefore, in the state shown in FIG. 11, the preceding first transport vehicle V1 is located inside the locus Tx anticipated to be drawn by the detection range X of the detection sensor 20 of the subsequent second transport vehicle V2. At the time shown in FIG. 11, the preceding first transport vehicle V1 is not actually located inside the detection range X.

According to the above configuration, even if the preceding first transport vehicle V1 stops after issuing the second occupation revocation request Sn2, the stopped preceding first transport vehicle V1 can be detected by the detection sensor 20 of the subsequent second transport vehicle V2 traveling along the second route R2. As described above, in the case where a transport vehicle V located ahead is detected by the detection sensor 20, the transport vehicle V provided with the detection sensor 20 decelerates or stops. Therefore, it is possible to appropriately avoid the case where the subsequent second transport vehicle V2 interferes with the preceding first transport vehicle V1.

Here, as described above, in the present embodiment, the preceding first transport vehicle V1 issues the occupation revocation request Sn at a position upstream of the first passing point Pp1 and the second passing point Pp2. As a result, the permission to occupy the first passing point Pp1 and the second passing point Pp2 can be revoked at an earlier time, and the passage permission Sp to pass through the first passing point Pp1 and the second passing point Pp2 can be obtained by the subsequent second transport vehicle V2 at an earlier time. Therefore, even though the preceding first transport vehicle V1 has not yet passed through the first passing point Pp1, permission to occupy the first passing point Pp1 may be obtained by the subsequent second transport vehicle V2. Also, even if the preceding first transport vehicle V1 has not yet passed through the second passing point Pp2, permission to occupy the second passing point Pp2 may be obtained by the subsequent second transport vehicle V2.

In view of this, in the present embodiment, in the case where the preceding first transport vehicle V1 issues the occupation revocation request Sn for a passing point Pp before passing through that passing point Pp, and permission for the first transport vehicle V1 to occupy that passing point Pp is revoked, the zone control device Cz can give the passage permission Sp for that passing point Pp to the subsequent second transport vehicle V2 while also allowing the preceding first transport vehicle V1 to pass through that passing point Pp. As a result, the preceding first transport vehicle V1, which has transferred permission to occupy the passing point Pp to the subsequent second transport vehicle V2, is able to pass through the passing point Pp without any problem.

Figure 13:
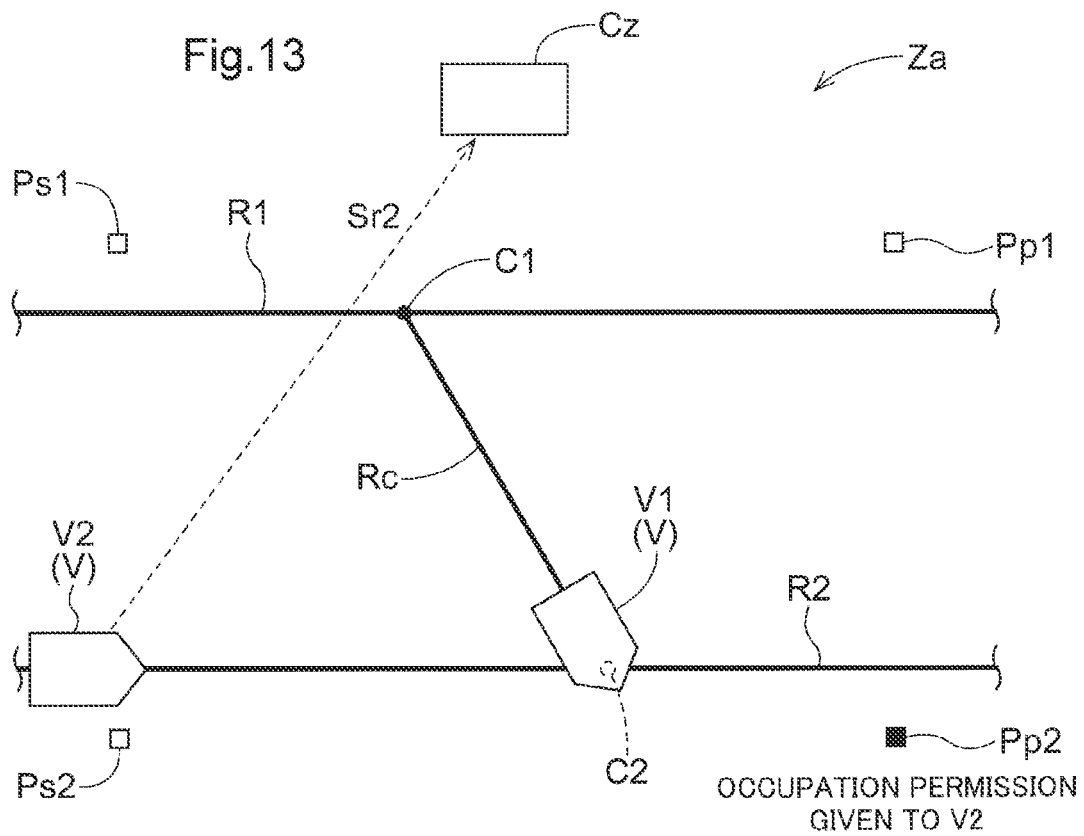
FIG. 13 is an illustrative diagram showing a case in which the subsequent transport vehicle is given permission to occupy the second passing point.
Figure 14:
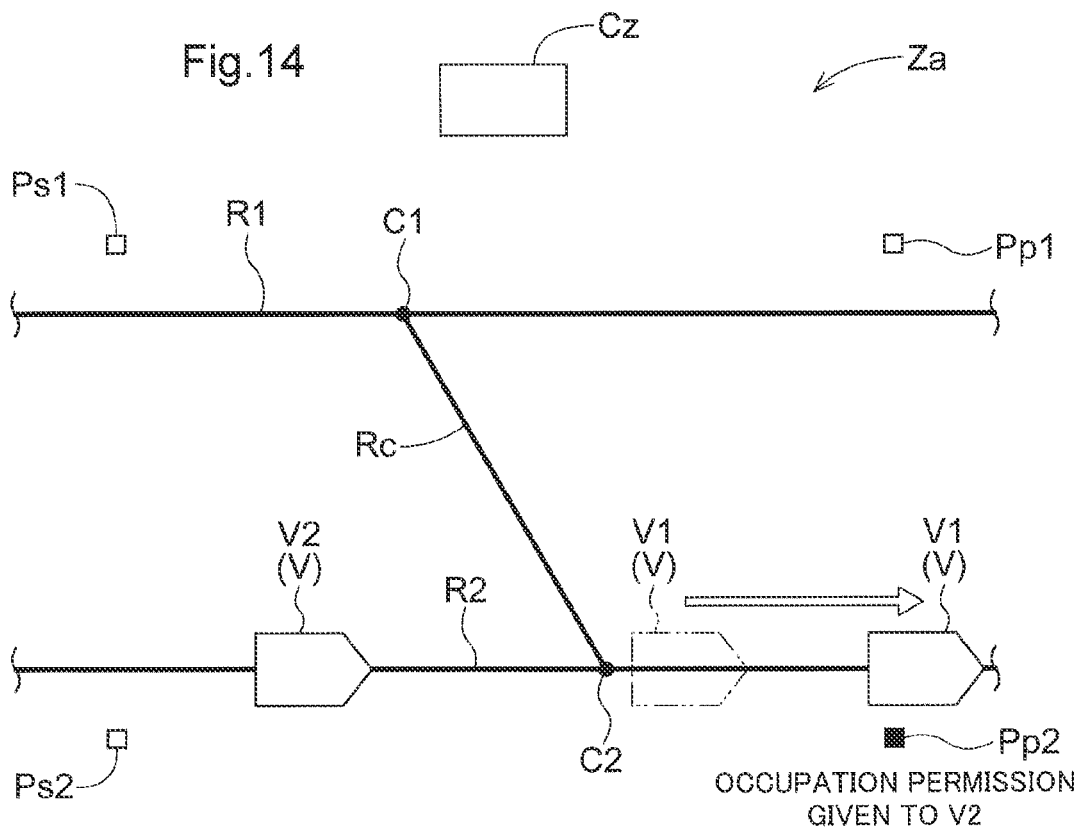
FIG. 14 is an illustrative diagram showing a case in which the subsequent transport vehicle is given permission to occupy the second passing point.

FIGS. 12 to 14 show an example in which the subsequent second transport vehicle V2 obtains permission to occupy the second passing point Pp2 before the preceding first transport vehicle V1 passes through the second passing point Pp2.

In the present embodiment, in the case where the preceding first transport vehicle V1 issues the second occupation revocation request Sn2 for the second passing point Pp2 before passing through the second passing point Pp2, and the permission for the preceding first transport vehicle V1 to occupy the second passing point Pp2 is revoked, the zone control device Cz can give the second passage permission Sp2 to the subsequent second transport vehicle V2 while also allowing the preceding first transport vehicle V1 that issued the second occupation revocation request Sn2 to pass through the second passing point Pp2.

The following is a description of the aforementioned case. As shown in FIG. 12, upon reaching the second set distance D2 from the first stopping point Ps1, the preceding first transport vehicle V1 issues the second occupation revocation request Sn2 to the zone control device Cz. Accordingly, the zone control device Cz revokes the permission for the preceding first transport vehicle V1 to occupy the second passing point Pp2. At this point, the preceding first transport vehicle V1 is located upstream of the second passing point Pp2.

As shown in FIG. 13, the subsequent second transport vehicle V2 issues, to the zone control device Cz, the second passage permission request Sr2 for requesting permission to pass through the second passing point Pp2. As described above, the permission for the preceding first transport vehicle V1 to occupy the second passing point Pp2 has been revoked, and therefore the zone control device Cz can give permission to occupy the second passing point Pp2 to the subsequent second transport vehicle V2. As a result, at the time point in FIG. 13, the subsequent second transport vehicle V2 has permission to occupy the second passing point Pp2. At this time, the preceding first transport vehicle V1 is still located upstream of the second passing point Pp2.

As shown in FIG. 14, the subsequent second transport vehicle V2 has permission to occupy the second passing point Pp2. Therefore, normally, another transport vehicle V would be excluded from passing through the second passing point Pp2. However, if the other transport vehicle V is the preceding first transport vehicle V1 that issued the second occupation revocation request Sn2, the zone control device Cz allows that preceding first transport vehicle V1 to pass through the second passing point Pp2. According to such a configuration, it is possible to give the second passage permission Sp2 to the subsequent second transport vehicle V2 while also not preventing the preceding first transport vehicle V1 from passing through the second passing point Pp2.

Other Embodiments

Next, other embodiments of the article transport facility will be described.

(1) In the above embodiment, an example is described in which the first set distance D1 is set such that when the preceding first transport vehicle V1 reaches a point corresponding to the first set distance D1 from the first stopping point Ps1 while traveling along the connection route Rc, the preceding first transport vehicle V1 is outside the locus Tx of the detection range X of the detection sensor 20 of the subsequent second transport vehicle V2 traveling forward along the first route R1 (see FIG. 10). However, the present invention is not limited to this example. As shown in FIG. 15, the first set distance D1 may be set such that when the preceding first transport vehicle V1 reaches a point corresponding to the first set distance D1 from the first stopping point Ps1 while traveling along the connection route Rc, the preceding first transport vehicle V1 is outside a travel locus Tv of the subsequent second transport vehicle V2 traveling forward along the first route R1. The travel locus Tv of the subsequent second transport vehicle V2 traveling forward along the first route R1 is the locus anticipated to be drawn by the subsequent second transport vehicle V2 when the second transport vehicle V2 travels forward along the first route R1. The travel locus Tv depends on the size of the body of the transport vehicle V and the traveling direction of the transport vehicle V. In the case of the above configuration, the transport vehicle V does not need to include the detection sensor 20.

(2) In the above embodiment, an example is described in which the first set distance D1 is set such that when the preceding first transport vehicle V1 reaches a point corresponding to the first set distance D1 from the first stopping point Ps1 while traveling along the connection route Rc, the preceding first transport vehicle V1 is outside the locus Tx of the detection range X of the detection sensor 20 of the subsequent second transport vehicle V2 traveling forward along the first route R1 (see FIG. 10). However, the present invention is not limited to this example. For example, FIG. 16 shows the case where the preceding first transport vehicle V1 traveling along the first route R1 is to pass through the first passing point Pp1, and the subsequent second transport vehicle V2 traveling along the first route R1 is to turn at the first connecting section C1 and travel along the connection route Rc. In this case, when the preceding first transport vehicle V1 is at a position that is downstream of the first connecting section C1 and outside the travel locus Tv of the subsequent second transport vehicle V2 passing through the first connecting section C1, the preceding first transport vehicle V1 issues, to the zone control device Cz, the first occupation revocation request Sn1 for revoking permission to occupy the first passing point Pp1. In other words, the first set distance D1 may be set such that when the preceding first transport vehicle V1 reaches a point corresponding to the first set distance D1 from the first stopping point Ps1 while traveling along the first route R1, the preceding first transport vehicle V1 is outside the travel locus Tv of the subsequent second transport vehicle V2 that is downstream of the first connecting section C1 and is to pass through the first connecting section C1. Accordingly, for example, even if the preceding first transport vehicle V1 that issued the first occupation revocation request Sn1 stops midway in the first route R1, it is possible to avoid the case where the subsequent second transport vehicle V2, which passes through the first connecting section C1 and travels along the connection route Rc, interferes with the stopped preceding first transport vehicle V1.

(3) In the above embodiment, an example is described in which the first set distance D1 and the second set distance D2 are set to different values. However, the present invention is not limited to this example, and the first set distance D1 and the second set distance D2 may be set as appropriate depending on the layout of the facility, for example, and may be set to the same value, for example.

Figure 17:
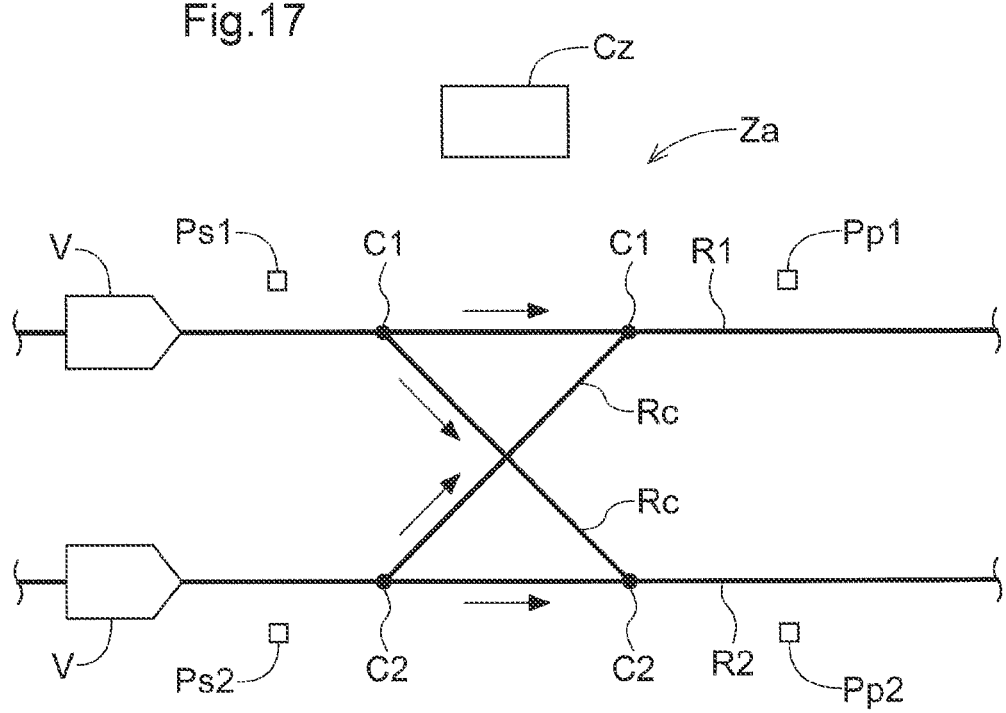
FIG. 17 is a plan view showing a specified zone according to another embodiment.
Figure 18:
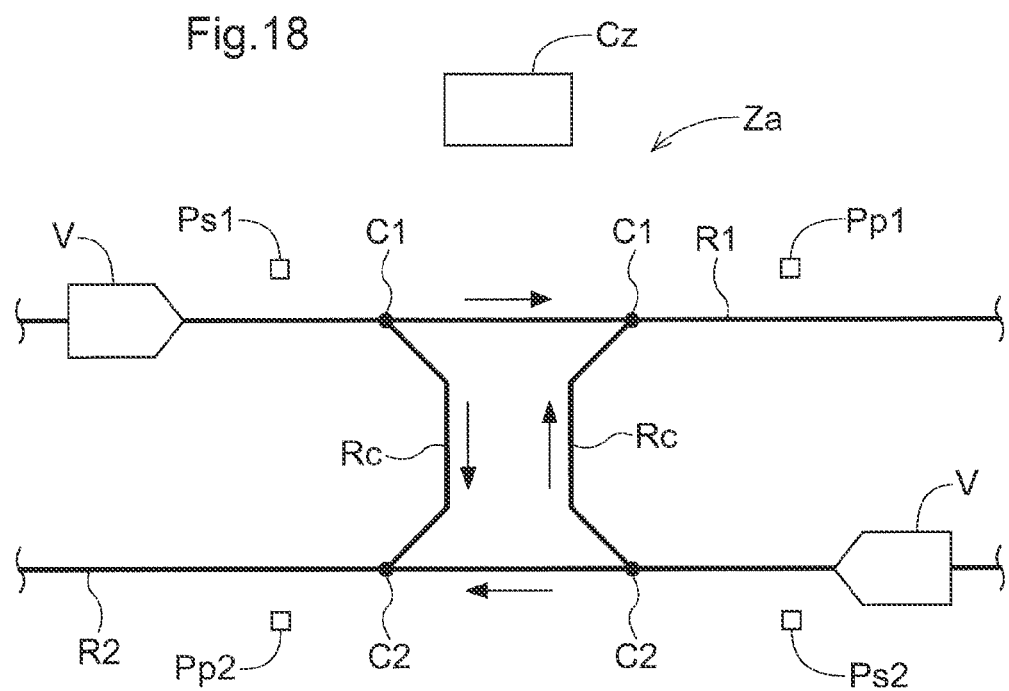
FIG. 18 is a plan view showing a specified zone according to another embodiment.

(4) In the above embodiment, an example is described in which the first route R1, the second route R2, and the connection route Rc form an "N" shape in plan view. However, the present invention is not limited to this example, and the connection route Rc may be arranged orthogonal to both the first route R1 and the second route R2 that are arranged parallel with each other in plan view. In this case, the first route R1, the second route R2, and the connection route Rc form an "H" shape in plan view. Furthermore, the present invention is not limited to the above example, the specified zone Za can be set as desired, and as long as the connection route Rc intersects both the first route R1 and the second route R2, any portion of the travel route R may be designated as the specified zone Za. Furthermore, as shown in FIGS. 17 to 19, for example, the connection route Rc may intersect the first route R1 and the second route R2 at an any angle, and at least one of the three routes may be curved. Also, a plurality of connection routes Rc may be connected to the first route R1 and the second route R2. For example, as shown in FIG. 19, the specified zone Za having the above configuration may be set in a portion (inter-process route) where a plurality of bays (intra-process routes) are connected in the travel route R.

(5) In the above embodiment, an example is described in which, in addition to the deceleration zone Ad, the constant speed zone Ac is set upstream of the stopping point Ps in the travel route R. However, the present invention is not limited to this example, and the constant speed zone Ac may not be set. In this case, it is preferable that the deceleration zone Ad is set at a position immediately adjacent to the upstream side of the stopping point Ps.

(6) In the above embodiment, an example is described in which the zone control device Cz registers the passing point Pp that pertains to the passage permission request Sr in order to give occupation permission to the transport vehicle V that issued the passage permission request Sr, and at the same time gives the passage permission Sp to that transport vehicle V. However, the present invention is not limited to this example, and the registration of the passing point Pp and the issuing of the passage permission Sp to the transport vehicle V by the zone control device Cz may be performed before or after one another. In this case, the registration of the passing point Pp may be performed first, and the issuing of the passage permission Sp to the transport vehicle V may be performed thereafter. On the contrary, the issuing of the passage permission Sp to the transport vehicle V may be performed first, and the registration of the passing point Pp may be performed thereafter.

(7) In the above embodiment, an example is described in which the passage permission request Sr, the passage permission Sp, and the occupation revocation request Sn are transmitted and received between the zone control device Cz and the transport vehicle V as signals. However, the present invention is not limited to this example, and the aforementioned signals may be transmitted and received between the zone control device Cz and the transport vehicle V via the host control device Ct.

(8) It should be noted that the configurations disclosed in the above-described embodiments can also be applied in combination with configurations disclosed in other embodiments as long as no contradiction arises. Regarding such other configurations as well, the embodiments disclosed in this specification are merely examples in all respects. Therefore, various modifications can be made as appropriate without departing from the spirit of the present disclosure.

Overview of Embodiments

The following is a description of aspects of the article transport facility described above.

An article transport facility includes:

a plurality of transport vehicles configured to transport an article;

a travel route travelable by the transport vehicles; and a zone control device configured to control the transport vehicles by giving a first passage permission or a second passage permission to the transport vehicles traveling in a specified zone in the travel route, wherein the specified zone includes:

a first route and a second route not intersecting each other; and a connection route connecting a first connecting section in the first route to a second connecting section in the second route, the first route and the second route are each a route along which the transport vehicles travel in one direction from an upstream side toward a downstream side, the first route includes a first passing point downstream of the first connecting section, the second route includes a second passing point downstream of the second connecting section, the first route further includes, upstream of the first connecting section, a first stopping point at which the transport vehicles stop in response to not obtaining the first passage permission, in response to giving the first passage permission to a transport vehicle among the plurality of transport vehicles, the zone control device gives permission to occupy the first passing point to the transport vehicle that obtained the first passage permission, in response to giving the second passage permission to a transport vehicle among the plurality of transport vehicles, the zone control device gives permission to occupy the second passing point to the transport vehicle that obtained the second passage permission, in order to travel from the first route or the second route to the connection route, the transport vehicles request both the first passage permission and the second passage permission from the zone control device, in response to the zone control device receiving a request for both the first passage permission and the second passage permission from a transport vehicle among the plurality of transport vehicles, in a case where both the first passing point and the second passing point are in a non-occupied state, in which occupation permission has not been given to a preceding transport vehicle, the zone control device gives permission to occupy both the first passing point and the second passing point to the transport vehicle that requested both the first passage permission and the second passage permission, each of the transport vehicles includes a travel distance detector configured to detect a travel distance, the travel distance detector has set therein a first set distance and a second set distance as travel distances from the first stopping point, and in a case where a specified transport vehicle, which is one of the plurality of transport vehicles, receives both the first passage permission and the second passage permission and is to pass through the second passing point, (i) in response to the travel distance of the specified transport vehicle from the first stopping point reaching the first set distance, the specified transport vehicle issues, to the zone control device, a first occupation revocation request for revoking permission to occupy the first passing point, and (ii) in response to the travel distance of the specified transport vehicle from the first stopping point reaching the second set distance, the specified transport vehicle issues, to the zone control device, a second occupation revocation request for revoking permission to occupy the second passing point.

In the specified zone described above, the first route and the second route do not intersect each other, and therefore if no transport vehicle passes through the connection route, transport vehicles can travel along the first route and the second route at the same time. According to this configuration, the determination regarding passage permission for a transport vehicle can be made separately for the first passing point provided in the first route and the second passing point provided in the second route. Therefore, in the case where a plurality of transport vehicles travel along the first route and the second route without passing through the connection route, the transport vehicles can be allowed to travel along the first route and the second route at the same time. Therefore, compared with the case where the determination regarding passage permission for transport vehicles is made for the specified zone as a whole, it is possible to allow the transport vehicles to travel through the specified zone more efficiently. On the other hand, in the case where a transport vehicle is to travel from the first route to the second route via the connection route or from the second route to the first route via the connection route, if both the first passing point and the second passing point are in the non-occupied state with respect to a preceding transport vehicle, the zone control device permits the transport vehicle to travel, and gives permission to occupy both the first passing point and the second passing point to the transport vehicle that was permitted to travel. Accordingly, it is possible to avoid interference between transport vehicles in the specified zone. As a result, it is possible to avoid the case where transport vehicles interfere with each other, and improve the transport efficiency of the article transport facility as a whole.

Also, according to the above configuration, a transport vehicle can issue the occupation revocation request upstream of a passing point, and in that case, occupation permission for the passing point can be revoked at an earlier time. This allows another transport vehicle to obtain permission to pass through that passing point at an earlier time. A plurality of transport vehicles can therefore travel smoothly in the specified zone. Also, according to the above configuration, the transport vehicle issues the occupation revocation request based on the travel distance detected by the travel distance detector, and therefore a member such as a marker indicating a reference point for issuing an occupation revocation request does not need to be disposed along the travel route. This facilitates simplifying the article transport facility.

It is preferable that each of the transport vehicles further includes a detection sensor configured to detect another transport vehicle located ahead, and the first set distance is set such that at a time at which a preceding transport vehicle reaches a point corresponding to the first set distance from the first stopping point while traveling along the connection route, the preceding transport vehicle is outside a locus of a detection range of the detection sensor of a subsequent transport vehicle traveling forward along the first route.

According to this configuration, even if, for example, the preceding transport vehicle stops midway in the connection route after making the first occupation revocation request, the preceding transport vehicle will not be in the detection range of the detection sensor of the subsequent transport vehicle traveling along the first route. Therefore, even in such a case, the subsequent transport vehicle can travel along the first route without any hindrance.

It is preferable that the first set distance is set such that at a time at which a preceding transport vehicle reaches a point corresponding to the first set distance from the first stopping point while traveling along the connection route, the preceding transport vehicle is outside a travel locus of a subsequent transport vehicle traveling forward along the first route.

According to this configuration, even if, for example, the preceding transport vehicle stops midway in the connection route after making the first occupation revocation request, it is possible to avoid the case where the subsequent transport vehicle traveling along the first route interferes with the preceding transport vehicle. Therefore, even in such a case, the subsequent transport vehicle can travel along the first route without any hindrance.

It is preferable that each of the transport vehicles further includes a detection sensor configured to detect another transport vehicle located ahead, and the second set distance is set such that at a time at which a preceding transport vehicle reaches a point corresponding to the second set distance from the first stopping point while traveling along the connection route, the preceding transport vehicle is inside a locus of a detection range of the detection sensor of a subsequent transport vehicle traveling forward along the second route.

According to this configuration, even if, for example, the preceding transport vehicle stops after issuing the second occupation revocation request, the stopped preceding transport vehicle can be detected by the detection sensor of the subsequent transport vehicle traveling along the second route. In this case, the subsequent transport vehicle can take a countermeasure such as stopping. It is therefore possible to avoid the case where the subsequent transport vehicle interferes with the preceding transport vehicle.

It is preferable that in response to permission for a preceding transport vehicle to occupy the second passing point being revoked due to the preceding transport vehicle issuing the second occupation revocation request before passing through the second passing point, the zone control device gives the second passage permission to a subsequent transport vehicle that requested the second passage permission.

According to this configuration, the second passage permission can be easily given to the subsequent transport vehicle at an earlier time.

It is preferable that in a case where a preceding transport vehicle traveling along the first route is to pass through the first passing point, and a subsequent traveling along the first route is to turn at the first connecting section and travel along the connection route, the preceding transport vehicle issues the first occupation revocation request to the zone control device at a time at which the preceding transport vehicle is at a position that is downstream of the first connecting section and outside a travel locus of the subsequent transport vehicle passing through the first connecting section.

According to this configuration, even if, for example, the preceding transport vehicle that issued the first occupation revocation request stops midway in the first route, it is possible to avoid the case where the subsequent transport vehicle that passes through the first connecting section and travels along the connection route interferes with the preceding stopped transport vehicle. Therefore, even in such a case, the subsequent transport vehicle can travel along the connection route without any problem.

INDUSTRIAL APPLICABILITY

The technology according to the present disclosure is applicable to an article transport facility that includes transport vehicles that transport articles, a travel route along which the transport vehicles travel, and a zone control device that controls the transport vehicles by giving passage permission to transport vehicles traveling in a specified zone in the travel route.

DESCRIPTION OF REFERENCE SIGNS

100 Article transport facility
V Transport vehicle
10 Travel distance detector
20 Detection sensor
X Detection range
Tx Detection range locus
Tv Travel locus
C1 First connecting section
C2 Second connecting section
Cz Zone control device
Za Specified zone
R Travel route
R1 First route
R2 Second route
Rc Connection route
D1 First set distance
D2 Second set distance
Pp Passing point
Pp1 First passing point
Pp2 Second passing point
Ps Stopping point
Ps1 First stopping point
Sp Passage permission
Sp1 First passage permission
Sp2 Second passage permission
Sn Occupation revocation request
Sn1 First occupation revocation request
Sn2 Second occupation revocation request

What is claimed is:

1. An article transport facility comprising:
   a plurality of transport vehicles configured to transport an article;
   a travel route travelable by the transport vehicles; and
   a zone control device configured to control the transport vehicles by giving a first passage permission or a second passage permission to the transport vehicles traveling in a specified zone in the travel route, and
   wherein:
   the specified zone comprises:
      a first route and a second route not intersecting each other; and
      a connection route connecting a first connecting section in the first route to a second connecting section in the second route,
   the first route and the second route are each a route along which the transport vehicles travel in one direction from an upstream side toward a downstream side,
   the first route comprises a first passing point downstream of the first connecting section,
   the second route comprises a second passing point downstream of the second connecting section,
   the first route further comprises, upstream of the first connecting section, a first stopping point at which the transport vehicles stop in response to not obtaining the first passage permission,
   in response to giving the first passage permission to a transport vehicle among the plurality of transport vehicles, the zone control device gives permission to occupy the first passing point to the transport vehicle that obtained the first passage permission,
   in response to giving the second passage permission to a transport vehicle among the plurality of transport vehicles, the zone control device gives permission to occupy the second passing point to the transport vehicle that obtained the second passage permission,
   in order to travel from the first route or the second route to the connection route, the transport vehicles request both the first passage permission and the second passage permission from the zone control device,
   in response to the zone control device receiving a request for both the first passage permission and the second passage permission from a transport vehicle among the plurality of transport vehicles, in a case where both the first passing point and the second passing point are in a non-occupied state, in which occupation permission has not been given to a preceding transport vehicle, the zone control device gives permission to occupy both the first passing point and the second passing point to the transport vehicle that requested both the first passage permission and the second passage permission,
   each of the transport vehicles comprises a travel distance detector configured to detect a travel distance,
   the travel distance detector has set therein a first set distance and a second set distance as travel distances from the first stopping point, and
   in a case where a specified transport vehicle, which is one of the plurality of transport vehicles, receives both the first passage permission and the second passage permission and is to pass through the second passing point, (i) in response to the travel distance of the specified transport vehicle from the first stopping point reaching the first set distance, the specified transport vehicle issues, to the zone control device, a first occupation revocation request for revoking permission to occupy the first passing point, and (ii) in response to the travel distance of the specified transport vehicle from the first stopping point reaching the second set distance, the specified transport vehicle issues, to the zone control device, a second occupation revocation request for revoking permission to occupy the second passing point.

2. The article transport facility according to claim 1, wherein each of the transport vehicles further comprises a detection sensor configured to detect another transport vehicle located ahead, and
   wherein the first set distance is set such that at a time at which a preceding transport vehicle reaches a point corresponding to the first set distance from the first stopping point while traveling along the connection route, the preceding transport vehicle is outside a locus of a detection range of the detection sensor of a subsequent transport vehicle traveling forward along the first route.

3. The article transport facility according to claim 1, wherein the first set distance is set such that at a time at which a preceding transport vehicle reaches a point corresponding to the first set distance from the first stopping point while traveling along the connection route, the preceding transport vehicle is outside a travel locus of a subsequent transport vehicle traveling forward along the first route.

4. The article transport facility according to claim 1, wherein each of the transport vehicles further comprises a detection sensor configured to detect another transport vehicle located ahead, and
   wherein the second set distance is set such that at a time at which a preceding transport vehicle reaches a point corresponding to the second set distance from the first stopping point while traveling along the connection route, the preceding transport vehicle is inside a locus of a detection range of the detection sensor of a subsequent transport vehicle traveling forward along the second route.

5. The article transport facility according to claim 1, wherein in response to permission for a preceding transport vehicle to occupy the second passing point being revoked due to the preceding transport vehicle issuing the second occupation revocation request before passing through the second passing point, the zone control device gives the second passage permission to a subsequent transport vehicle that requested the second passage permission.

6. The article transport facility according to claim 1, wherein in a case where a preceding transport vehicle traveling along the first route is to pass through the first passing point, and a subsequent traveling along the first route is to turn at the first connecting section and travel along the connection route, the preceding transport vehicle issues the first occupation revocation request to the zone control device at a time at which the preceding transport vehicle is at a position that is downstream of the first connecting section and outside a travel locus of the subsequent transport vehicle passing through the first connecting section.

\* \* \* \* \*